US008082559B2

(12) United States Patent
Yamada et al.

(10) Patent No.: US 8,082,559 B2
(45) Date of Patent: Dec. 20, 2011

(54) MOVEABLE IN-VEHICLE APPARATUS OPERABLE BY MULTIPLE USERS

(75) Inventors: Kenji Yamada, Tokyo (JP); Takehiko Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1167 days.

(21) Appl. No.: 11/715,931

(22) Filed: Mar. 9, 2007

(65) Prior Publication Data

US 2008/0013266 A1 Jan. 17, 2008

(30) Foreign Application Priority Data

Mar. 16, 2006 (JP) ................................. 2006-072381

(51) Int. Cl.
*G11B 17/04* (2006.01)
(52) U.S. Cl. ...................................................... 720/647
(58) Field of Classification Search .................. 720/646, 720/647; 361/688, 679.01, 679.05, 679.06, 361/690
See application file for complete search history.

(56) References Cited

U.S. PATENT DOCUMENTS

| 5,497,365 | A | * | 3/1996 | Lee | ................................ | 720/614 |
| 5,862,468 | A | * | 1/1999 | Kim | ................................ | 455/321 |
| 6,791,844 | B2 | * | 9/2004 | Tobishima et al. | ........... | 361/759 |
| 7,443,659 | B2 | * | 10/2008 | Cho | ......................... | 361/679.27 |
| 7,597,290 | B2 | * | 10/2009 | Sugiura et al. | ............... | 248/27.3 |
| 7,742,300 | B2 | * | 6/2010 | Takasou | ........................ | 361/695 |
| 7,774,104 | B2 | * | 8/2010 | Itoh | ................................... | 701/1 |
| 2005/0139731 | A1 | * | 6/2005 | Park et al. | .................... | 248/27.3 |

FOREIGN PATENT DOCUMENTS

| JP | 06-092187 | 4/1994 |
| JP | 08-007418 | 1/1996 |
| JP | 2002-166786 | 6/2002 |
| JP | 2003-069920 | 3/2003 |

\* cited by examiner

*Primary Examiner* — Brian Miller
(74) *Attorney, Agent, or Firm* — Finnegan, Henderson, Farabow, Garrett & Dunner, LLP

(57) ABSTRACT

Disclosed herein is an in-vehicle apparatus including, an apparatus body installed in a vehicle compartment, and a front panel disposed at a front surface of the apparatus body and provided with an operating member for operating the apparatus body, wherein a drive mechanism connecting the apparatus body and the front panel to each other is provided, and the drive mechanism is operative to move the front panel between an attached use position where the front panel is attached to the front surface of the apparatus body and an inclined use position where one of left and right side parts of the front panel projects more forwards relative to the front surface of the apparatus body than the other.

19 Claims, 30 Drawing Sheets

MOVEABLE IN-VEHICLE APPARATUS OPERABLE BY MULTIPLE USERS

CROSS REFERENCES TO RELATED APPLICATIONS

The present invention contains subject matter related to Japanese Patent Application JP 2006-072381 filed in the Japanese Patent Office on Mar. 16, 2006, the entire contents of which being incorporated herein by reference.

BACKGROUND OF THE INVENTION

1. Field of the Invention

The present invention relates to an in-vehicle apparatus.

2. Description of the Related Art

As an in-vehicle apparatus such as a car audio system, a car navigation system, etc., there is an apparatus which includes an apparatus body installed in a vehicle compartment, and a front panel disposed at a front surface of the apparatus body and provided with operating members for operating the apparatus body, for example refer to Japanese Patent Laid-open No. 2002-166786.

The in-vehicle apparatus is incorporated into a location of the vehicle body such as a dashboard, a center console panel, etc. in the condition where the front panel faces rearwards.

Therefore, where the in-vehicle apparatus is disposed at a location, fronting on the front side of either one of the driver's seat and the assistant driver's seat, of the vehicle body, the operating members can be operated easily by the user seated on one of the two seats but not much easily be operated by the user seated on the other of the seats.

SUMMARY OF THE INVENTION

Meanwhile, in most cases of this kind of in-vehicle apparatuses, the in-vehicle apparatus is disposed at the center console panel at an intermediate position between the driver's seat and the assistant driver's seat. Therefore, both of the users seated respectively on the driver's seat and the assistant driver's seat feel difficulty in operating the operating members.

Thus, there is a need for an in-vehicle apparatus which can be easily operated by both of the users seated respectively on the driver's seat and the assistant driver's seat.

According to an embodiment of the present invention, there is provided an in-vehicle apparatus including: an apparatus body installed in a vehicle compartment; and a front panel disposed at a front surface of the apparatus body and provided with an operating member for operating the apparatus body; wherein a drive mechanism connecting the apparatus body and the front panel to each other is provided, and the drive mechanism is operative to move the front panel between an attached use position where the front panel is attached to the front surface of the apparatus body and an inclined use position where one of left and right side parts of the front panel projects more forwards relative to the front surface of the apparatus body than the other.

According to the embodiment of the present invention, the front panel can be moved to the inclined use position where one of the left and right side parts of the front panel projects more forwards relative to the front surface of the apparatus body than the other. Therefore, the front surface of the front panel can be made to face to the user, irrespective of the place where the apparatus body is installed. Accordingly, it is easier for the user to operate the operating members, which is advantageous for enhancing the convenience in use of the in-vehicle apparatus.

DETAILED DESCRIPTION OF THE PREFERRED EMBODIMENT

Figure 1:
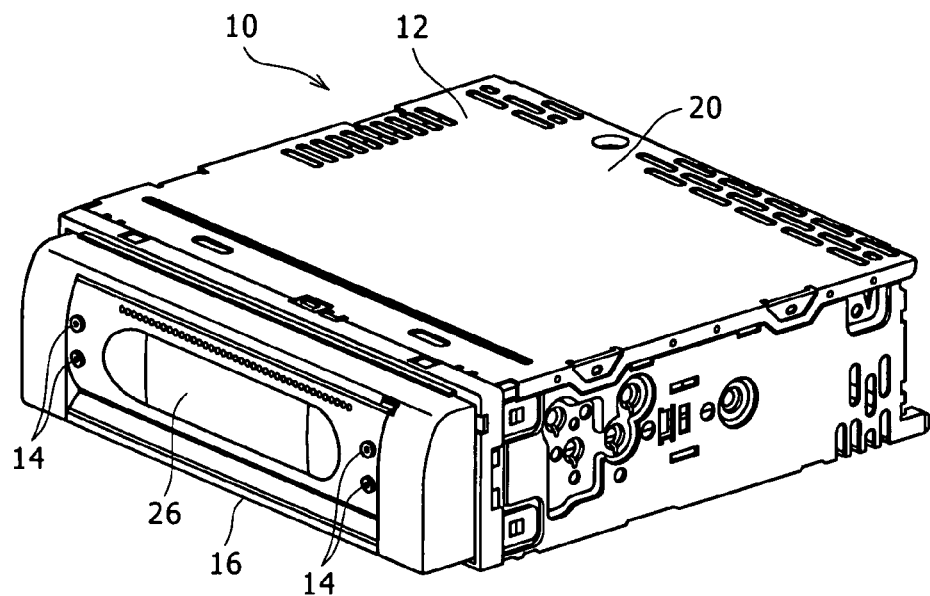
FIG. 1 is a perspective view showing the condition where a front panel of an in-vehicle apparatus according to an embodiment is in an attached position.

Now, an embodiment of the present invention will be described below referring to the drawings.

FIGS. 1 to 7 are perspective views of an in-vehicle apparatus 10 according to this embodiment of the present invention.

As shown in FIGS. 1 to 7, the in-vehicle apparatus 10 in this embodiment is a car audio system using a disk-formed recording medium (optical disk) such as CD, MD, DVD, etc. by loading and unloading the recording medium.

The in-vehicle apparatus 10 includes an apparatus body 12 in which an essential part of the car audio system is contained, and a front panel 16 provided with a plurality of operating members 14 for operating the apparatus body 12. The apparatus body 12 and the front panel 16 are connected to each other by a drive mechanism 18.

Figure 3:
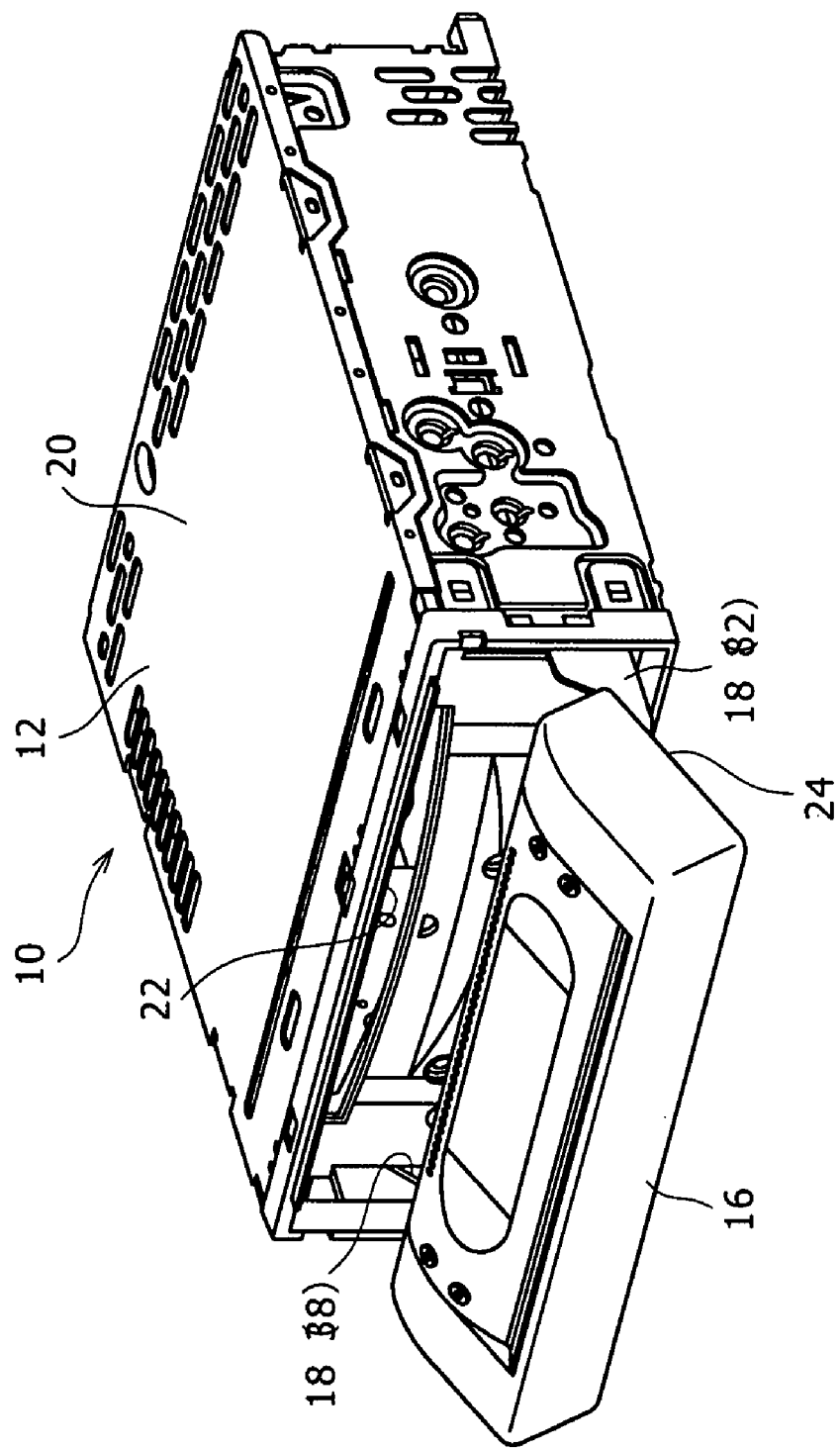
FIG. 3 is a perspective view showing the condition where the front panel of the in-vehicle apparatus is in a second posture at the forwardly moved position.

As shown in FIGS. 1 and 3, the apparatus body 12 has a casing 20 having a flat rectangular parallelopiped shape.

The front surface of the apparatus body 12 has a rectangular shape elongate in the left-right direction, and the front surface is provided with a loading/unloading gate 22 for loading and unloading a disk-formed recording medium therethrough.

The front panel 16 is for opening and closing the front surface of the apparatus body 12, and, at the front surface of the front panel 16, a display unit 1012 (see FIG. 32) is provided in the state of facing forwards. The display unit 1012 includes, for example, LEDs or a liquid crystal display.

Figure 32:
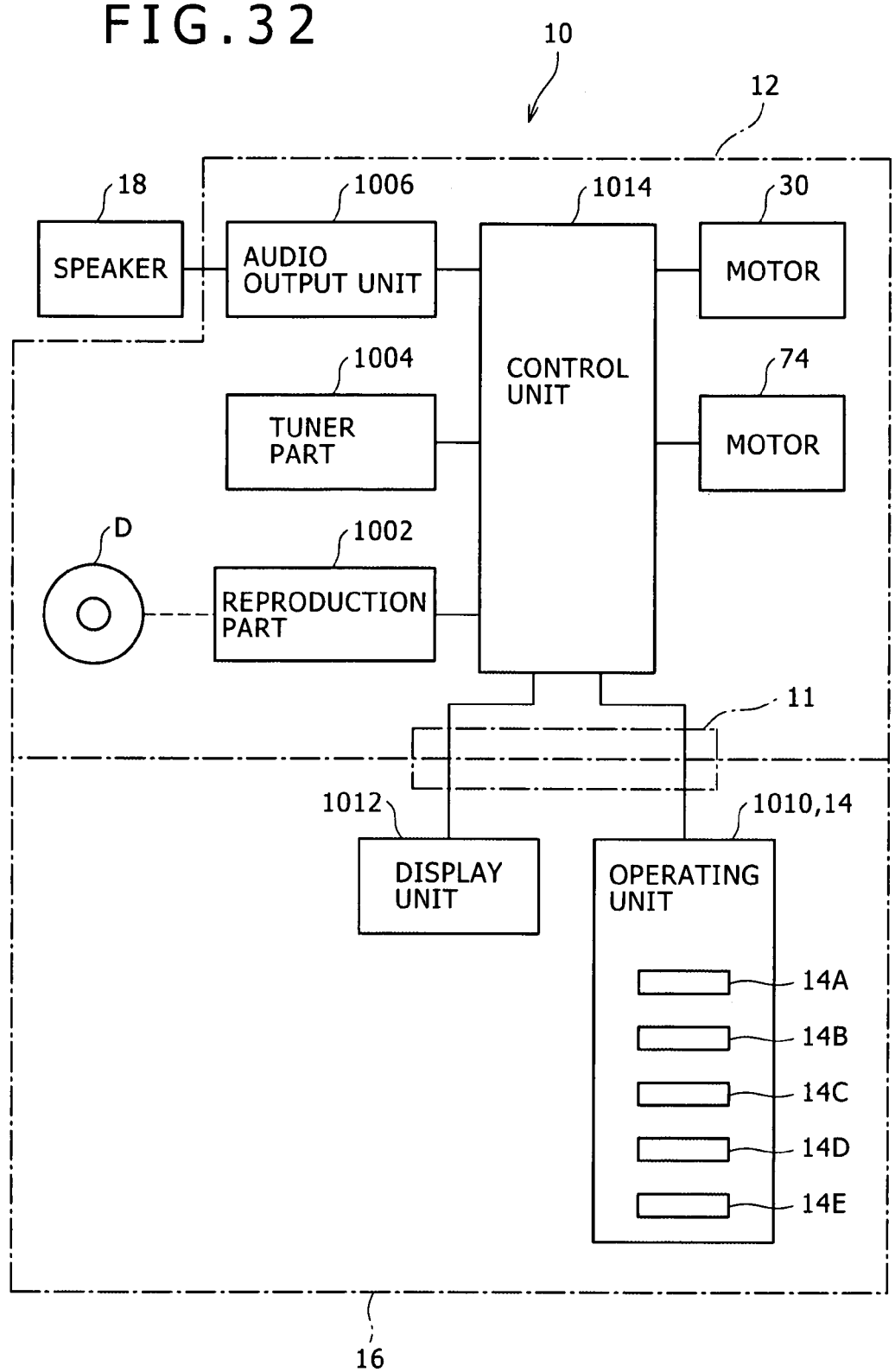
FIG. 32 is a block diagram showing the configuration of a control system in the in-vehicle apparatus.

The plurality of operating members 14 are arranged at the front surface of the front panel 16, and the operating members 14 constitute an operating unit 1010 (see FIG. 32).

Though not shown, the operating members 14 include a volume control for controlling the volume of the sound generated from a speaker 18 (see FIG. 32), operating switches or starting and stopping of reproduction of signals recorded on the disk-formed recording medium D, selection of a tune, fast forward feed, fast reverse feed, ejection of the disk-formed recording medium D, etc., tuning switches for tuning in a tuner unit, and so on.

Further, as shown in FIG. 32, the operating members 14 include an open/close button 14A for opening and closing the front panel 16, a left normal rotation button 14B and a left reverse rotation button 14C for normal rotation and reverse rotation of a motor 30 in a left drive mechanism 26 to be described later, and a right normal rotation button 14D and a right reverse rotation button 14E for normal rotation and reverse rotation of a motor 74 in a right drive mechanism 28 to be described later.

In this embodiment, the operating members 14 and the display unit 1012 are electrically connected to a control unit 1014 (described later) through a flexible substrate 11 (see FIG. 32) provided between the apparatus body 12 and the front panel 16, whereby control signals are transferred from the control unit 1014 to the operating members 14 and the display unit 1012 and vice versa.

Figure 31:
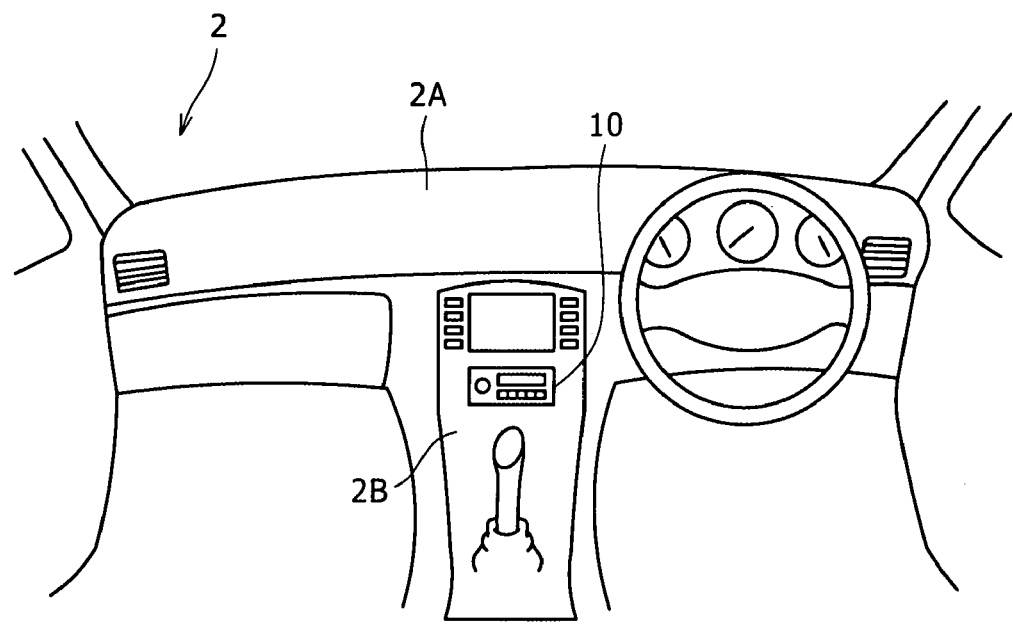
FIG. 31 is an illustration of the condition where the in-vehicle apparatus is installed in a vehicle compartment.

FIG. 31 is an illustration of the condition where the in-vehicle apparatus 10 is installed in a vehicle compartment, and FIG. 32 is a block diagram showing the configuration of a control system in the in-vehicle apparatus 10.

As shown in FIG. 31, the apparatus body 12 is incorporated in a location of the vehicle body, such as a dashboard 2A and a center console panel 2B located in the vehicle compartment 2; in this embodiment, the apparatus body 12 is incorporated in the center console panel 2B located between the driver's seat and the assistant driver's seat, and the front surface of the apparatus body 12 fronts on the inside of the vehicle compartment.

As shown in FIG. 32, an essential part of the car audio system includes, for example, a reproduction unit 1002, a tuner unit 1004, an audio output unit 1006, the operating unit 1010, the display unit 1012, the control unit 1014 and the like.

The reproduction unit 1002 is a unit for reproduction of data, such as audio data, recorded on the disk-formed recording medium D such as CD, MD, DVD, etc. and for outputting an audio signal or the like. Incidentally, a recording/reproduction unit for recording and reproduction of data on the disk-formed recording medium D may be provided, in place of the reproduction unit 1002.

The tuner unit 1004 is a unit for receiving electromagnetic waves such as AM waves and FM waves transmitted from radio broadcasting stations and for outputting an audio signal.

The audio output unit 1006 is a unit for applying predetermined signal processings inclusive of amplification to the audio signal supplied through the control unit 1014 and for supplying the processed signal to the speaker 18 incorporated in the vehicle compartment 2, to thereby generate a sound from the speaker 18.

The operating unit 1010 is a unit operated to give commands for operations of the reproduction unit 1002, the tuner unit 1004, and the audio output unit 1006, and control signals according to operations on the operating unit 1010 are supplied to the control unit 1014.

The display unit 1012 is a unit for displaying the operating conditions of the reproduction unit 1002, the tuner unit 1004, the audio output unit 1006 and the like by use of characters, symbols, icons, or images or the like, based on the control conducted by the control unit 1014.

The control unit 1014 is a unit for controlling the reproduction unit 1002, the tuner unit 1004, the audio output unit 1006, the operating unit 1010, and the display unit 1012.

Incidentally, in this embodiment, the reproduction unit 1002, the tuner unit 1004, the audio output unit 1006, and the control unit 1014 are provided in the apparatus body 12, while the operating unit 1010 and the display unit 1012 are provided in the front panel 16.

In addition, the apparatus body 12 is provided with the motors 30 and 74 for moving the drive mechanism 18, and the rotations of the motors 30 and 74 are controlled by the control unit 1014.

Now, the drive mechanism 18 will be described below.

Figure 8:
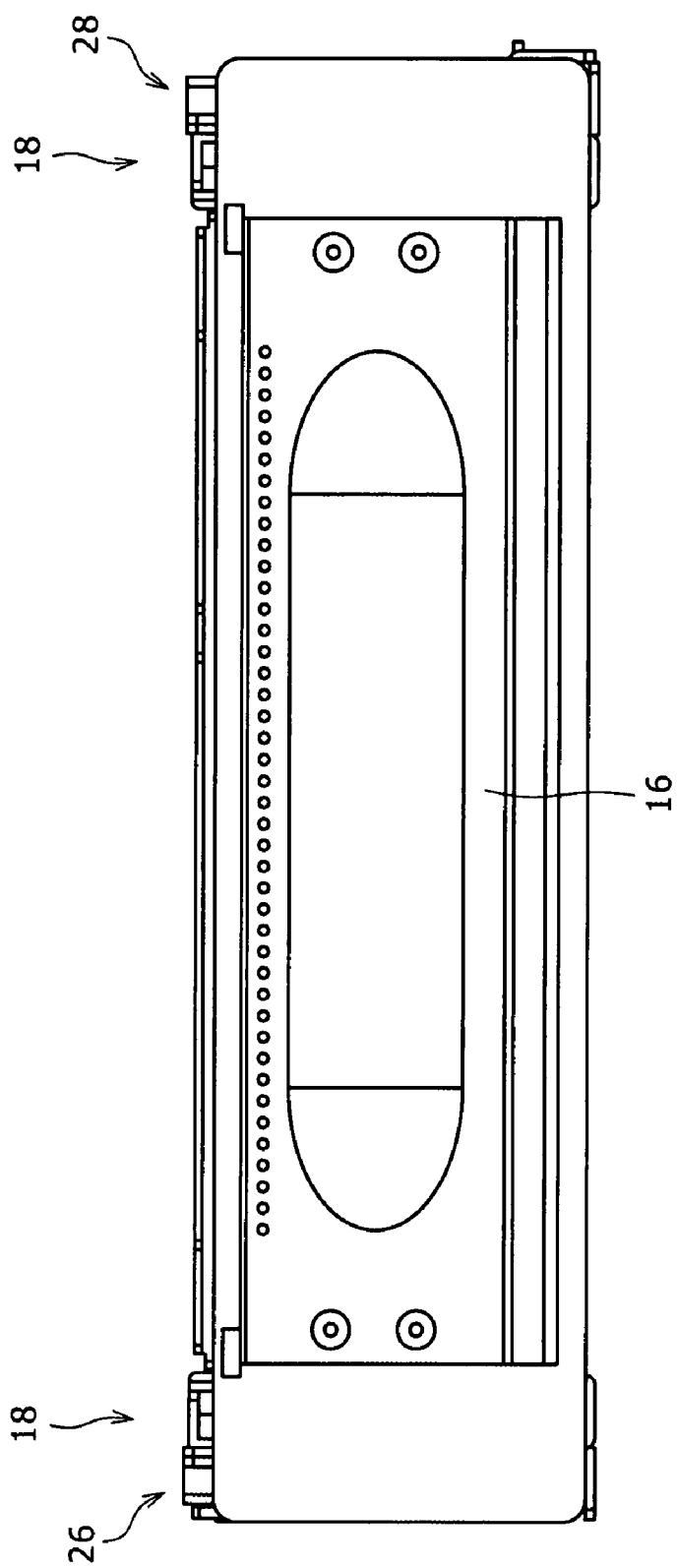
FIG. 8 is a front view of the front panel and a drive mechanism.
Figure 9:
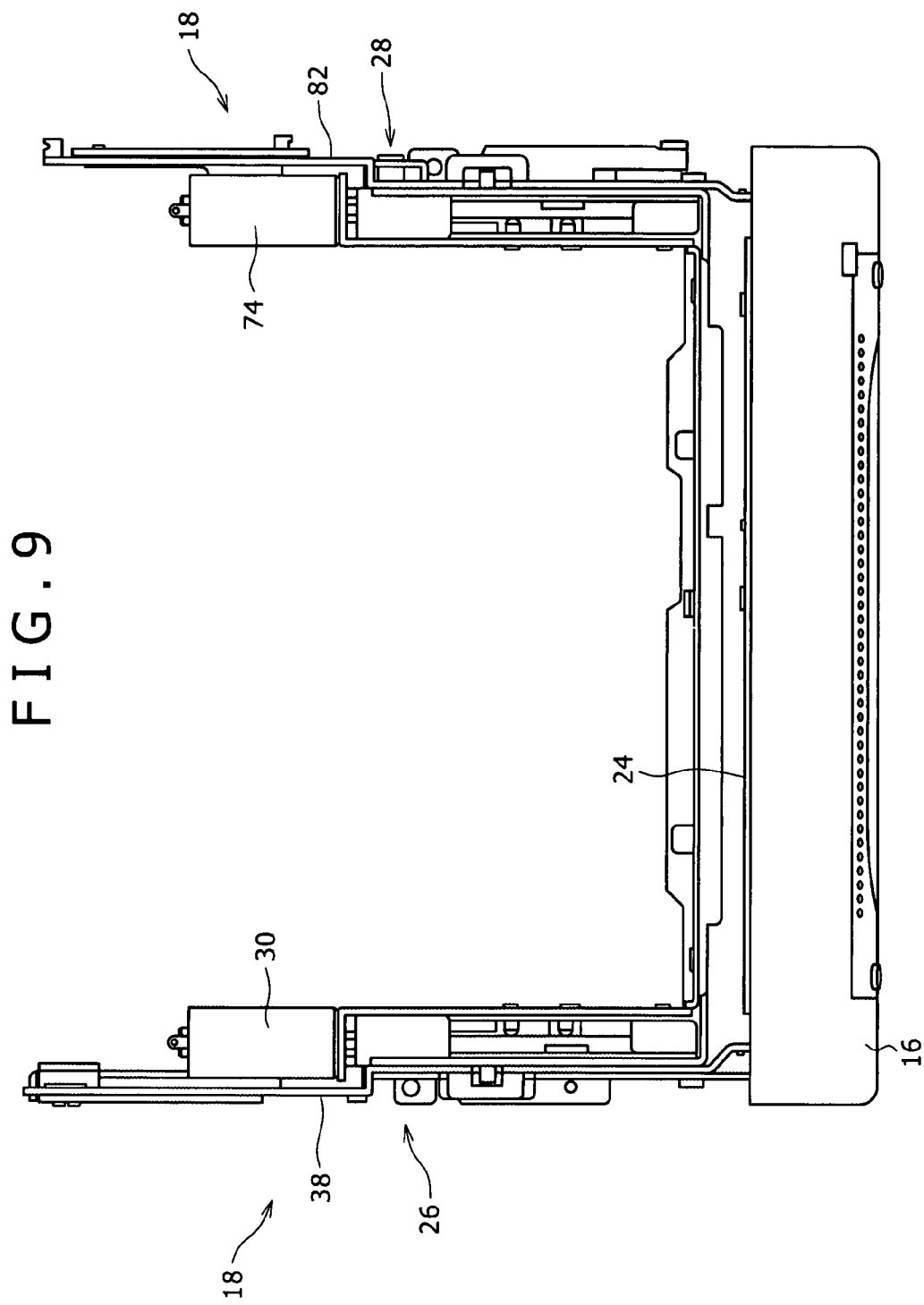
FIG. 9 is a plan view of the front panel and the drive mechanism.
Figure 10:
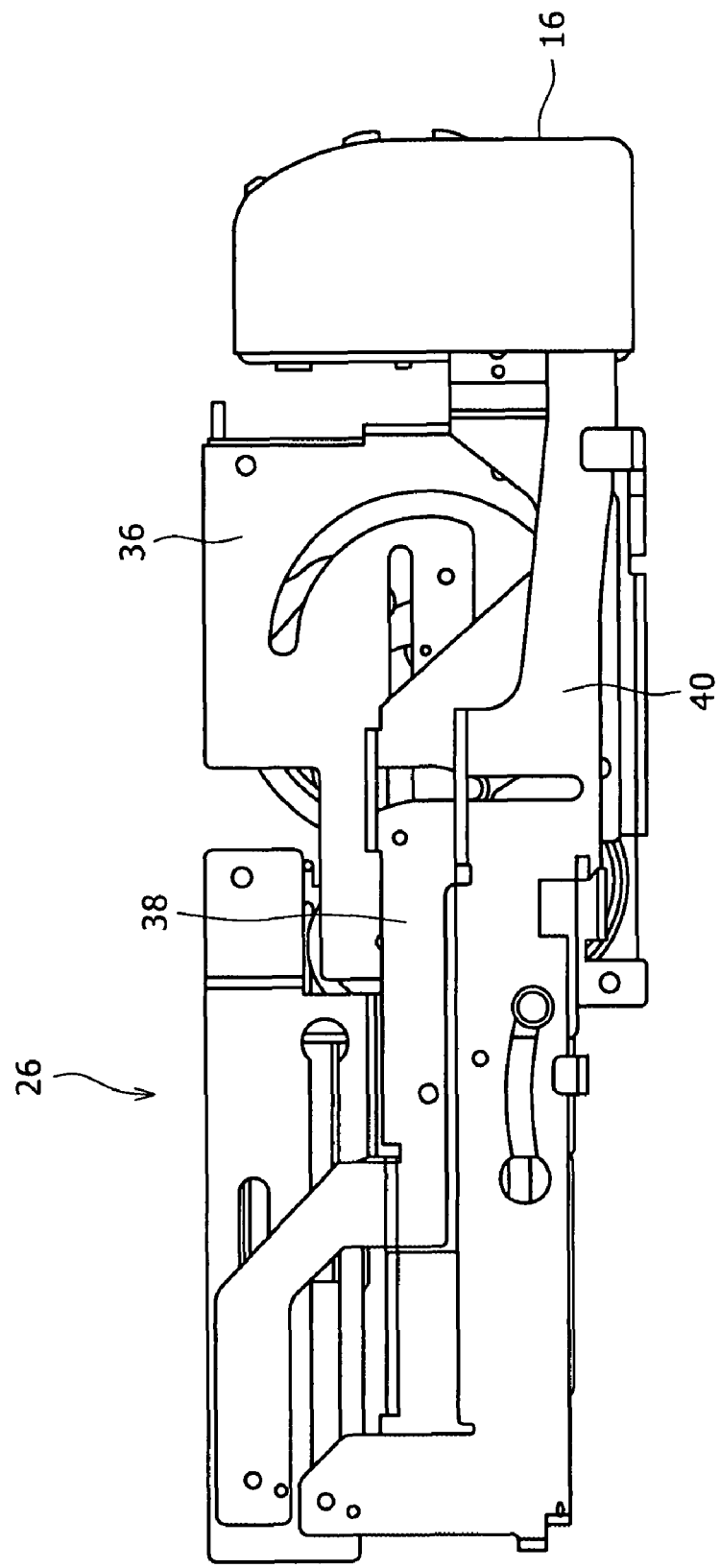
FIG. 10 is a left side view of the front panel and the drive mechanism.
Figure 11:
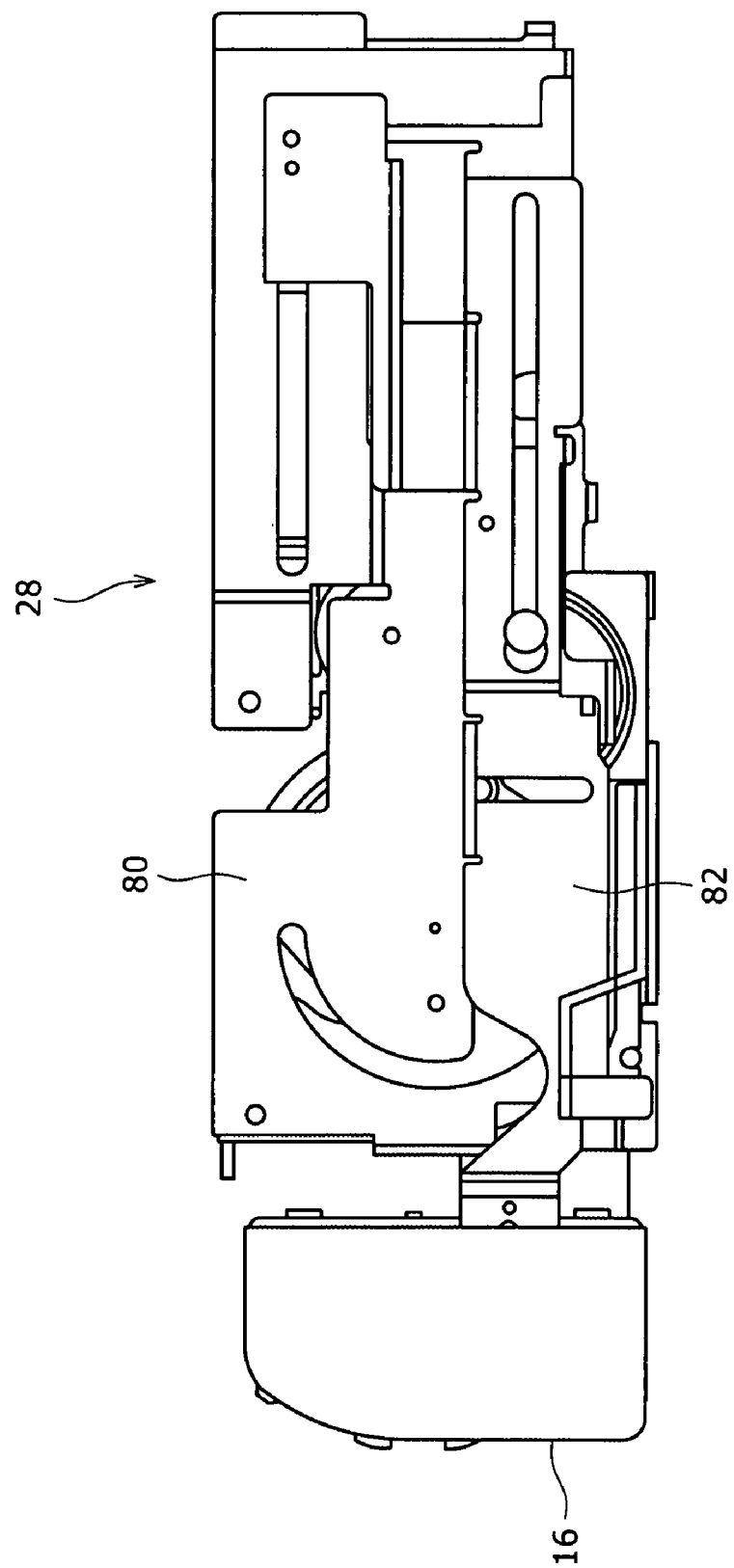
FIG. 11 is a right side view of the front panel and the drive mechanism.
Figure 12:
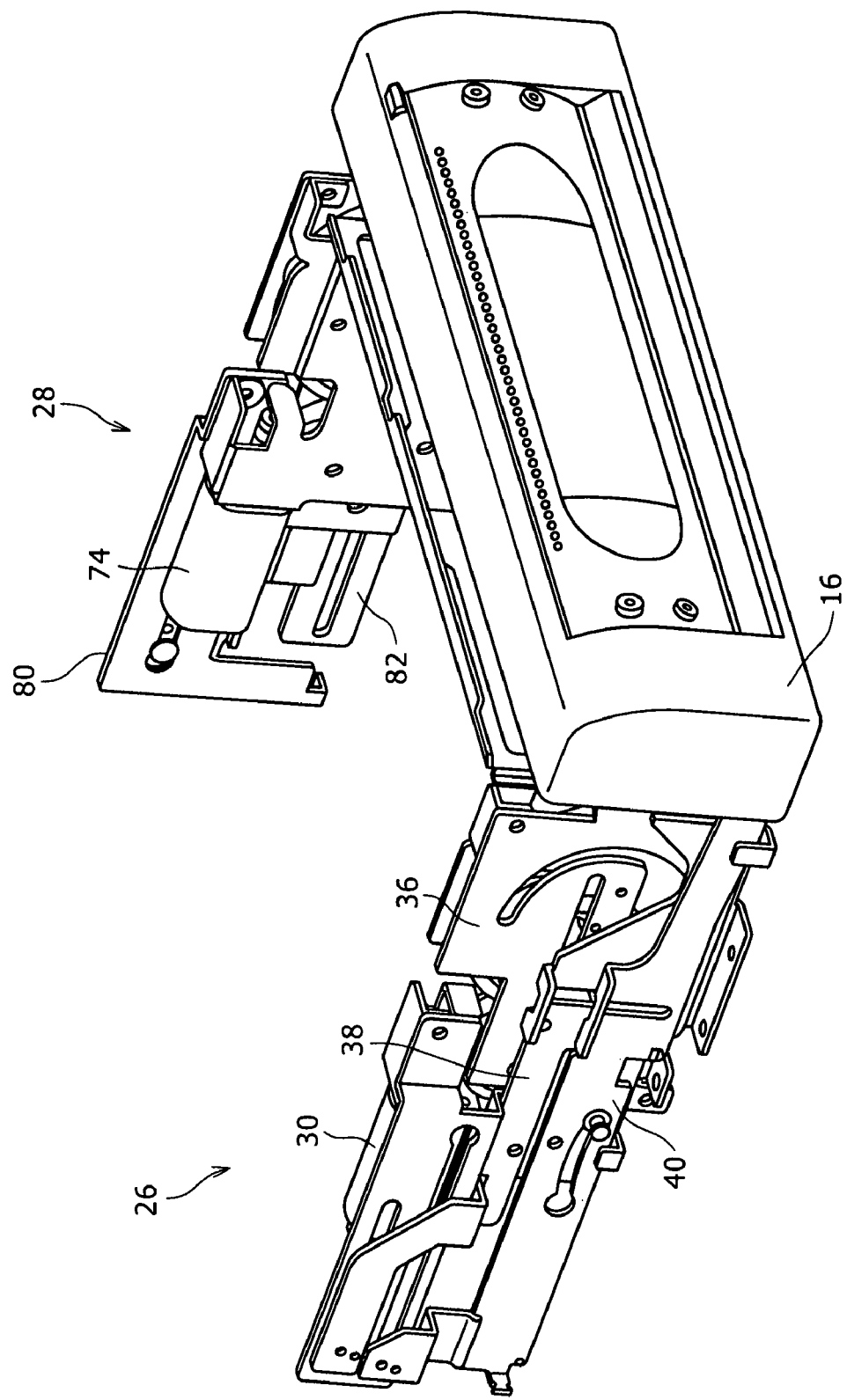
FIG. 12 is a perspective view of the front panel and the drive mechanism.

FIG. 8 is a front view of the front panel 16 and the drive mechanism 18, FIG. 9 is a plan view of the front panel 16 and the drive mechanism 18, FIG. 10 is a left side view of the front panel 16 and the drive mechanism 18, FIG. 11 is a right side view of the front panel 16 and the drive mechanism 18, FIG.

Figure 13:
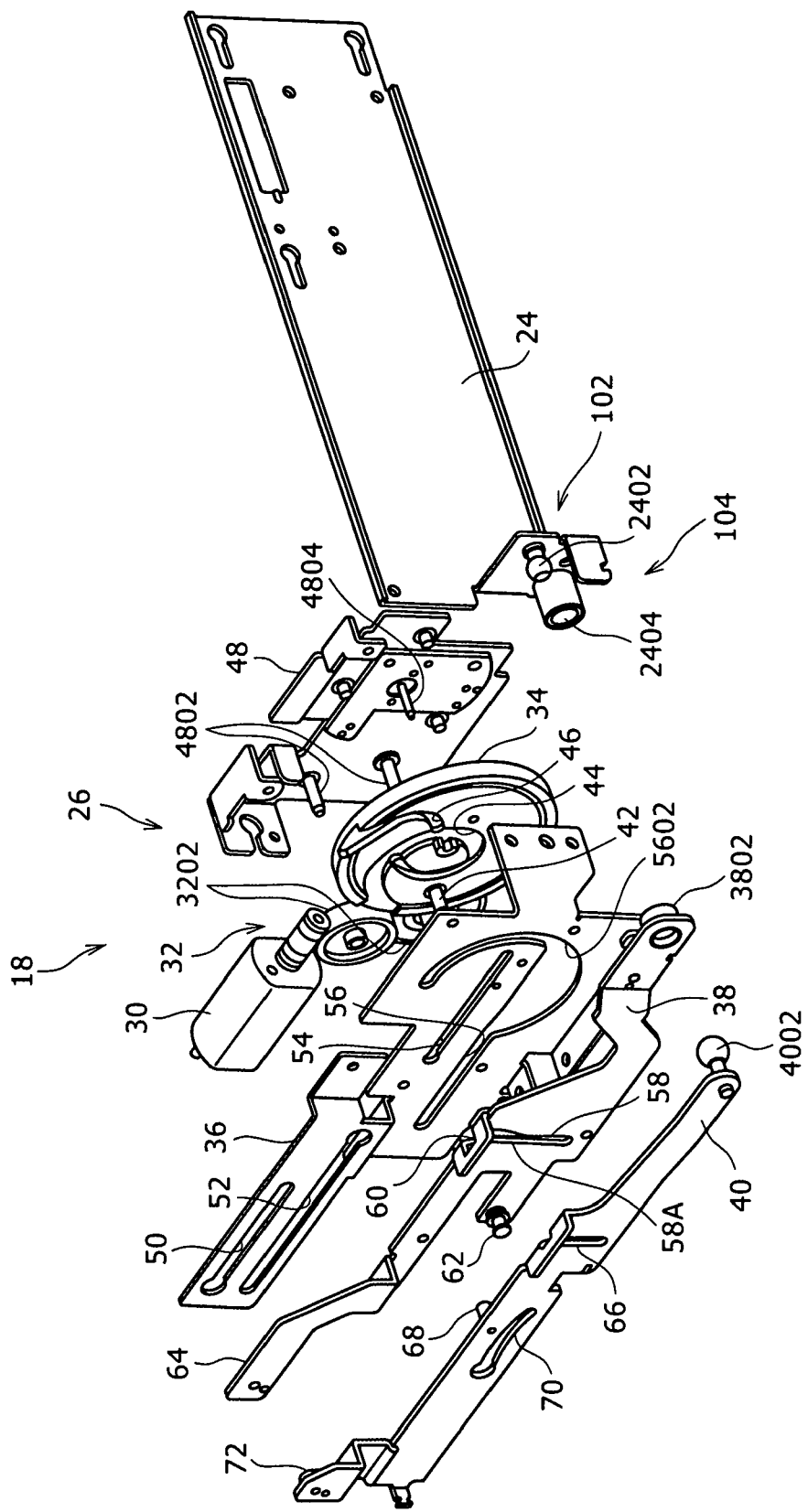
FIG. 13 is an exploded perspective view of a left drive mechanism.
Figure 14:
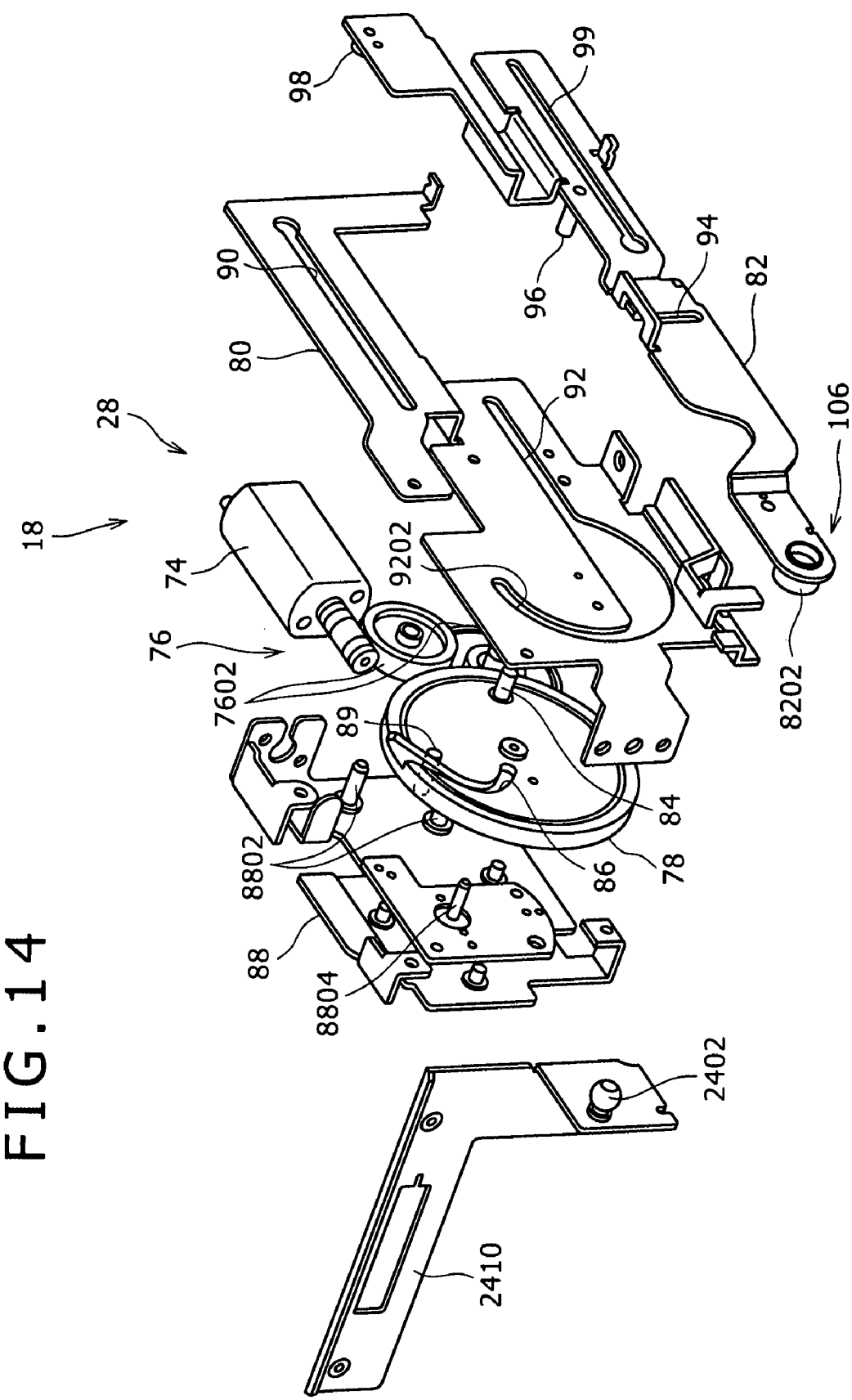
FIG. 14 is an exploded perspective view of a right drive mechanism.

12 is a perspective view of the front panel 16 and the drive mechanism 18, FIG. 13 is an exploded perspective view of the left drive mechanism, and FIG. 14 is an exploded perspective view of the right drive mechanism.

The front panel 16 is provided to be detachable from a holder 24 supported by the drive mechanism 18.

Figure 2:
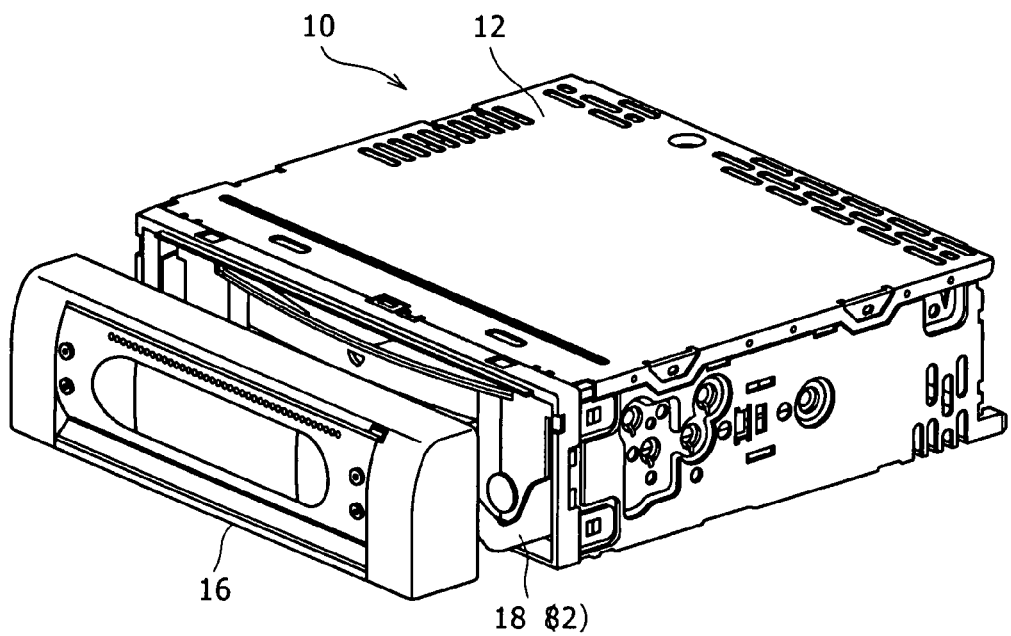
FIG. 2 is a perspective view showing the condition where the front panel of the in-vehicle apparatus according to the embodiment is in a forwardly moved position.

The front panel 16, in the first posture such that the front panel 16 is parallel to the front surface of the apparatus body 12, is moved by the drive mechanism 18 to an attached use position shown in FIG. 1 where the front panel 16 is attached to the front surface of the apparatus body 12, a forwardly moved position shown in FIG. 2 where the front panel 16 has been moved forwards while keeping parallelism with the front surface with the apparatus body 12, and an inclined use position shown in FIGS. 4 to 7 where one of left and right side parts of the front panel 16 projects more forwards relative to the front surface of the apparatus body 12 than the other.

As shown in FIGS. 8 to 12, the drive mechanism 18 includes the left drive mechanism 26 provided at a left side part of the apparatus body 12 and connected to a left side part of the front panel 16, and the right drive mechanism 28 provided at a right side part of the apparatus body 12 and connected to a right side part of the front panel 16.

As shown in FIG. 13, the left drive mechanism 26 includes a motor 30, a gear train 32, a cam plate 34, a guide plate 36, a left forward-rearward movement arm 38, a vertical swing arm 40 and the like.

Power of the motor 30 is transmitted with speed reduction through the gear train 32 to the cam plate 34, and the cam plate 34 is rotated normally and reversely by the normal and reverse rotations of the motor 30.

The cam plate 34 is disposed with its axis set in the left-right direction, a forward-rearward movement first cam pin 42 is projectingly provided at an end face of the cam plate 34, and the cam plate 34 is provided with a stopping cam groove 44 and a vertical swing cam groove 46.

Incidentally, gears 3202 constituting the gear train 32 and the cam plate 34 are rotatably supported by support shafts 4802, 4804 on a plate 48 attached to the casing 20.

As shown in FIG. 13, the guide plate 36 is provided on the outer side of the cam plate 34, and the guide plate 36 is attached to the casing 20.

The guide plate 36 extends in the front-rear direction, and a rear half part of the guide plate 36 is provided with an upper guide groove 50 and a lower guide groove 52 which extend rectilinearly, with a vertical spacing therebetween. The lower guide groove 52 extends more forwards than the upper guide groove 50.

A front half part of the guide plate 36 is provided with an upper guide groove 54 and a lower guide groove 56 which extend rectilinearly, with a vertical spacing therebetween. The lower guide groove 56 is provided at its front end with a relief groove 5602, for the forward-rearward movement first cam pin 42. The relief groove 5602 extends through the lower side and the front side of the upper guide groove 54 to the upper side.

As shown in FIG. 13, the left forward-rearward movement arm 38 extends in the front-rear direction at a left side part of the apparatus body 12, and its front end is connected to a left side part of the front panel 16.

A groove 58A extending vertically and opened at its upper end is provided in an intermediate part in the extending direction of the left forward-rearward movement arm 38, the stopping cam pin 60 projecting to the inner side and the cam pin 62 projecting to the outer side are provided at a location on the rear side of the groove 58A, and the cam pin 64 projecting to the inner side is provided at the rear end in the extending direction of the left forward-rearward movement arm 38.

Incidentally, a lower part of the groove 58A is formed as a forward-rearward movement first cam groove 58 and, therefore, the upper end of the forward-rearward first cam groove 58 is opened.

The forward-rearward movement first cam pin 42 of the cam plate 34 extends through the lower guide groove 56 or the relief groove 5602 in the guide plate 36, and is engaged with the forward-rearward movement first cam groove 58.

The stopping cam pin 60 provided at the intermediate part of the left forward-rearward movement arm 38 is engaged with the upper guide groove 54 in the guide plate 36, and is contained in the stopping cam groove 44 in the cam plate 34.

The cam pin 64 at the rear end of the left forward-rearward movement arm 38 is engaged with the upper guide groove 50 in the guide plate 36.

Figure 30:
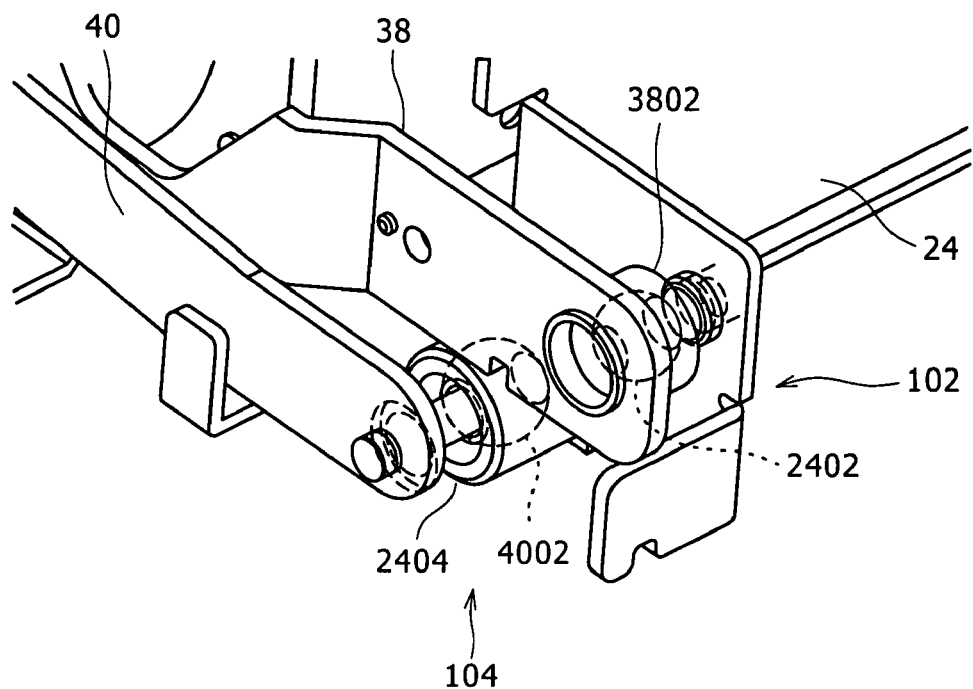
FIG. 30 is a perspective view of first and second ball joints.

As shown in FIGS. 13 and 30, at the front end of the left forward-rearward movement arm 38, a spherical element 2402 provided at the left end of the holder 24 is engaged with a tubular member 3802 provided at the front end of the left forward-rearward movement arm 38. The spherical element 2402 and the tubular member 3802 constitute a first ball joint 102; therefore, the front end of the left forward-rearward movement arm 38 and the left end of the holder 24 are connected to each other through the first ball joint 102.

As shown in FIG. 13, the vertical swing arm 40 extends in the front-rear direction on the outer side of the left forward-rearward movement arm 38, and its front end is connected to the lower end of a left side part of the front panel 16.

A forward-rearward movement first cam groove 66 extending vertically and opened at its upper end is provided in an intermediate part in the extending direction of the vertical swing arm 40, a vertical swing cam pin 68 projecting to the inner side is provided at a location on the rear side of the forward-rearward movement first cam groove 66, a cam groove 70 is provided on the lower side of the vertical swing cam pin 68, and a cam pin 72 projecting to the inner side is provided at the rear end of the vertical swing arm 40.

The forward-rearward movement first cam pin 42 of the cam plate 34 extends through the lower guide groove 56 or the relief groove 5602 in the guide plate 36 and through the forward-rearward movement first cam groove 58 in the left forward-rearward movement arm 38, and is engaged with the forward-rearward movement first cam groove 66 in the vertical swing arm 40.

The vertical swing cam pin 68 at the intermediate part of the vertical swing arm 40 is so formed that it can extend through the lower guide groove 56 or the relief groove 5602 in the guide plate 36 can be engaged with the vertical swing cam groove 46 in the cam plate 34.

The cam pin 62 at the intermediate part of the left forward-rearward movement arm 38 is engaged with the guide groove 70 in the intermediate part of the vertical swing arm 40.

The cam pin 72 at the rear end of the vertical swing pin 40 is engaged with the lower guide groove 52 in the guide plate 36.

As shown in FIGS. 13 and 30, at the front end of the vertical swing arm 40, a spherical element 4002 provided at the front end of the vertical swing arm 40 is engaged with a tubular member 2404 provided at the left end of the holder 24. The spherical element 4002 and the tubular member 2404 constitute a second ball joint 104.

Therefore, with the vertical swing arm 40 moved in the front-rear direction, the holder 24 is swung vertically, with the location of the first ball joint 102 as a center.

As shown in FIG. 14, the right drive mechanism 28 includes a motor 74, a gear train 76, a cam plate 78, a guide plate 80, a right forward-rearward movement arm 82 and the like.

Power of the motor 74 is transmitted with speed reduction through the gear train 76 to the cam plate 78, and the cam plate 78 is rotated normally and reversely by the normal and reverse rotations of the motor 74.

The cam plate 78 is disposed with its axis set in the left-right direction, a forward-rearward movement first cam pin 84 is provided at an end face of the cam plate 78, and the cam plate 78 is provided with a forward-rearward movement second cam groove 86.

Incidentally, gears 7602 constituting the gear train 76 and the cam plate 78 are rotatably supported by support shafts 8802, 8804 on a plate 88 attached to the casing 20.

The plate 88 is provided with a cam pin 89 projecting to the outer side.

As shown in FIG. 14, the guide plate 80 is provided on the outer side of the cam plate 78, and the guide plate 80 is attached to the casing 20.

The guide plate 80 extends in the front-rear direction, and a rear half part of the guide plate 80 is provided with a guide groove 90 extending rectilinearly.

A front half part of the guide plate 80 is provided with a guide groove 92 extending rectilinearly in the front-rear direction, and a relief groove 9202, for the forward-rearward movement first cam pin 84, which communicates with the guide groove 92 is provided at the front end of the guide groove 92.

As shown in FIG. 14, the right forward-rearward movement arm 82 extends in the front-rear direction at a right side part of the apparatus body 12, and its front end is connected to a right side part of the front panel 16.

A forward-rearward movement first cam groove 94 extending vertically and opened at its upper end is provided in an intermediate part in the extending direction of the right forward-rearward movement arm 82, a forward-rearward movement second cam pin 96 projecting to the inner side is provided at a location on the rear side of the forward-rearward movement first cam groove 94, and a cam pin 98 projecting to the inner side is provided at the rear end in the extending direction of the right forward-rearward movement arm 82.

A rear half part in the extending direction of the right forward-rearward movement arm 82 is provided with a guide groove 99 extending in the front-rear direction.

The forward-rearward movement first cam pin 84 of the cam plate 78 extends through the guide groove 92 or the relief groove 9202 in the guide plate 80, and is engaged with the forward-rearward movement first cam groove 94 in the right forward-rearward movement arm 82.

The forward-rearward movement second cam pin 96 provided at the intermediate part of the right forward-rearward movement arm 82 is selectively engaged with either one of the guide groove 92 in the guide plate 80 and the forward-rearward movement second cam groove 86 in the cam plate 78.

The cam pin 98 at the rear end of the right forward-rearward movement arm 82 is engaged with the guide groove 90 in the guide plate 80.

The cam pin 89 of the plate 88 is engaged with the guide groove 99 in the right forward-rearward movement arm 82.

As shown in FIG. 14, at the front end of the right forward-rearward movement arm 82, a spherical element 2404 provided at the right end of an attaching piece 2410 is engaged with a tubular member 8202 provided at the front end of the right forward-rearward movement arm 82, and the spherical element 2404 and the tubular member 8202 constitute a third ball joint 106; therefore, the front end of the right forward-rearward movement arm 82 and a right side part of the front panel 16 are connected to each other through the third ball joint 106. Incidentally, the attaching piece 2410 is attached to a right side part of the holder 24.

Now, motions will be described below.

In the following description, it is assumed that the normal rotation, reverse rotation and stopping of the motors 30 and 74 are controlled by the control unit 1014.

<Attached Use Position>

Description will be made starting from the condition where the front panel 16 is located at an attached use position in its first posture, as shown in FIG. 1.

The left drive mechanism 26 will be described.

Figure 15:
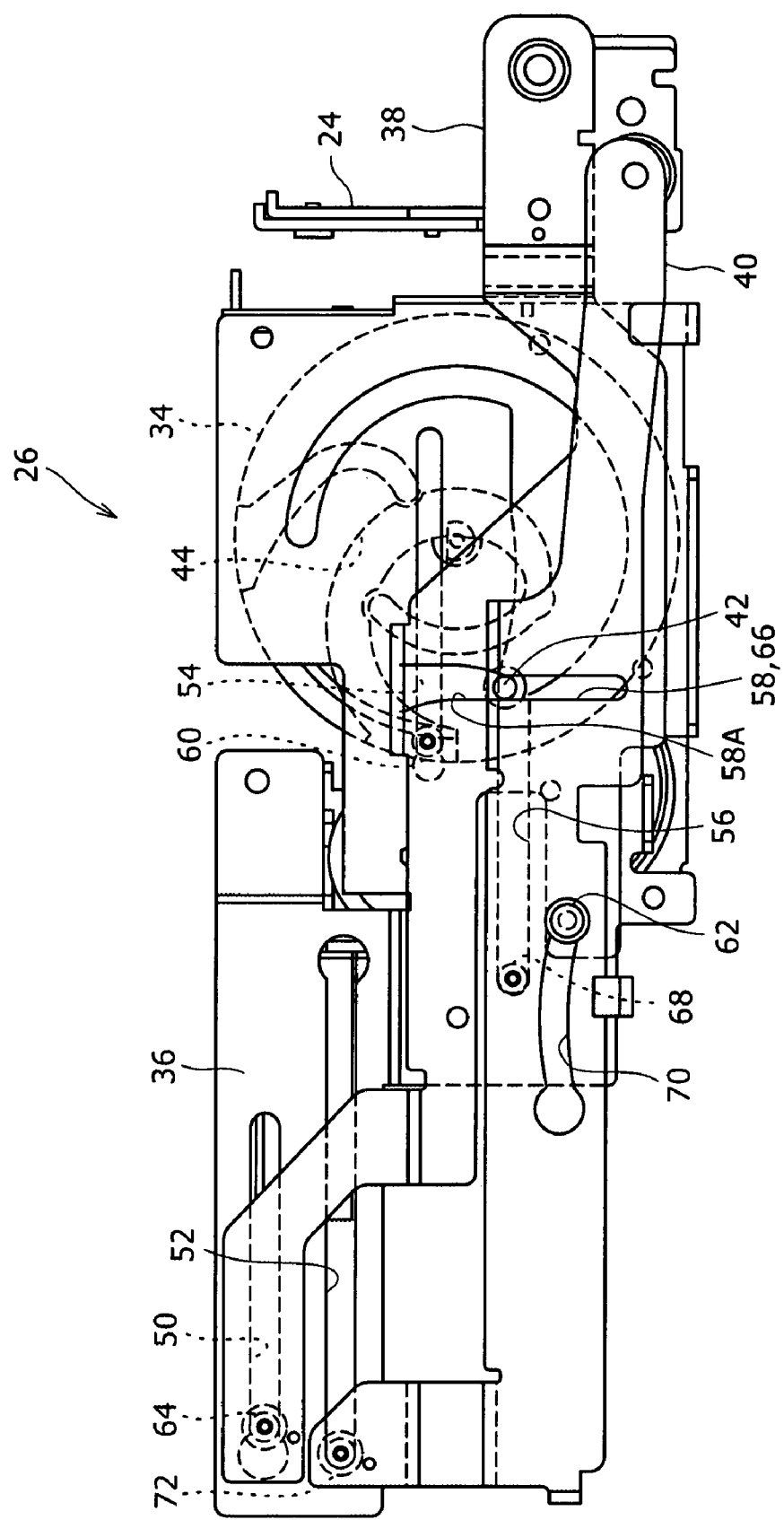
FIG. 15 is an illustration of an operation of the left drive mechanism.

As shown in FIG. 15, the forward-rearward movement first cam pin 42 of the cam plate 34 is in engagement with a vertically intermediate part of the forward-rearward movement first cam groove 58 in the left forward-rearward movement arm 38, and, simultaneously, the forward-rearward movement first cam pin 42 is in engagement with an upper part of the forward-rearward movement first cam groove 66 in the vertical swing arm 40.

The stopping cam pin 60 at the intermediate part of the left forward-rearward movement arm 38 is in engagement with the rear end of the upper guide groove 54 in the guide plate 36, and is located at a location near the outer end of the stopping cam groove 44 in the cam plate 34.

The cam pin 64 at the rear end of the left forward-rearward movement arm 38 is in engagement with the rear end of the cam groove 54 in the guide plate 36.

The cam pin 62 of the left forward-rearward movement arm 38 is in engagement of the front end of the cam groove 70 in the intermediate part of the vertical swing arm 40.

The vertical swing cam pin 68 of the vertical swing arm 40 is in engagement with the rear end of the lower guide groove 56 in the guide plate 36.

The cam pin 72 at the rear end of the vertical swing arm 40 is in engagement with the rear end of the lower guide groove 52 in the guide plate 36.

The right drive mechanism 28 will be described.

Figure 21:
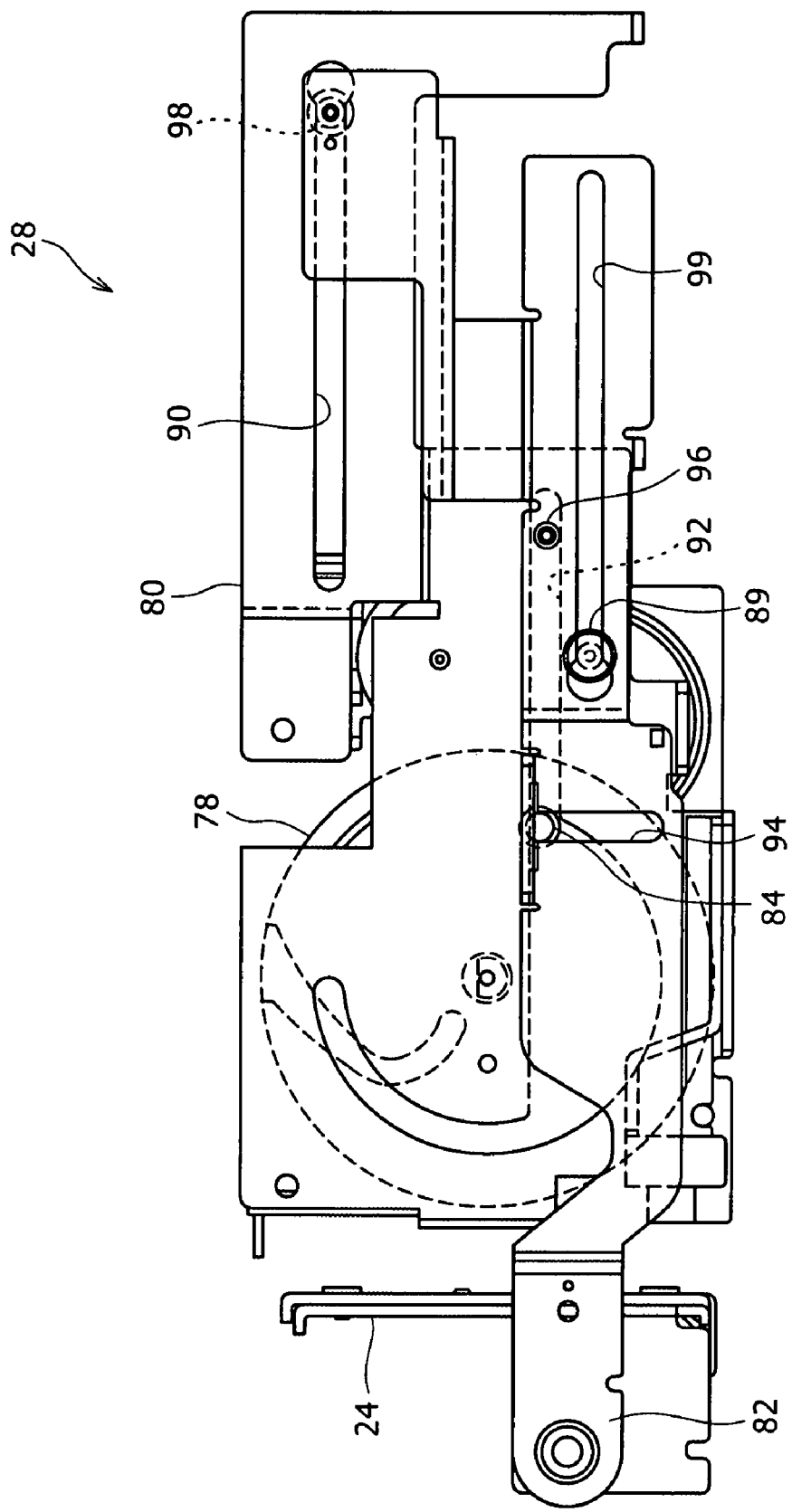
FIG. 21 is an illustration of an operation of the right drive mechanism.

As shown in FIG. 21, the forward-rearward movement first cam pin 84 of the cam plate 78 is in engagement with the upper end of the forward-rearward movement first cam groove 94 in the right forward-rearward movement arm 82.

The forward-rearward movement second cam pin 96 at the intermediate part of the right forward-rearward movement arm 82 is in engagement with the rear end of the guide groove 92 in the guide plate 80.

The cam pin 89 of the right forward-rearward movement arm 82 is in engagement with the front end of the guide groove 99.

The cam pin 98 at the rear end of the right forward-rearward movement arm 82 is in engagement with the rear end of the cam groove 90 in the guide plate 80.

In this condition, the front panel 16 is in its first posture such that its front surface is parallel to the front surface of the casing 20, and the loading/unloading gate 22 is closed with the front panel 16.

<Forwardly Moved Position>

In the next place, the case where the front panel 16 is moved from the attached use position to the forwardly moved position will be described below.

When the motor 30 in the left drive mechanism is rotated normally in the condition where the front panel 16 is located in the attached use position, as shown in FIG. 15, the cam plate 34 is rotated normally, whereby the left forward-rearward movement arm 38 and the vertical swing arm 40 are moved forwards as one body through the functions of the forward-rearward movement first cam pin 42, the forward-rearward movement first cam groove 58 and the forward-rearward movement first cam groove 66.

At the time of this forward movement, the stopping cam pin 60 at the intermediate part is moved forwards in the upper guide groove 54, and is moved toward the inner end in the stopping cam groove 44. In addition, the cam pins 64 and 72 at the rear end are moved forwards in the upper guide grooves 50 and 52, respectively. Besides, the vertical swing cam pin 68 is moved forwards in the lower guide groove 56.

In addition, when the motor 74 in the right drive mechanism is rotated normally in the condition where the front panel 16 is located in the attached use position, as shown in FIG. 21, the cam plate 78 is rotated normally, whereby the right forward-rearward movement arm 82 is moved forwards through the functions of the forward-rearward movement first cam pin 84 and the forward-rearward movement first cam groove 94, the forward-rearward movement second cam pin 96 is moved forwards in the guide groove 92, and the cam pin 98 at the rear end is moved forwards in the cam groove 90.

Figure 16:
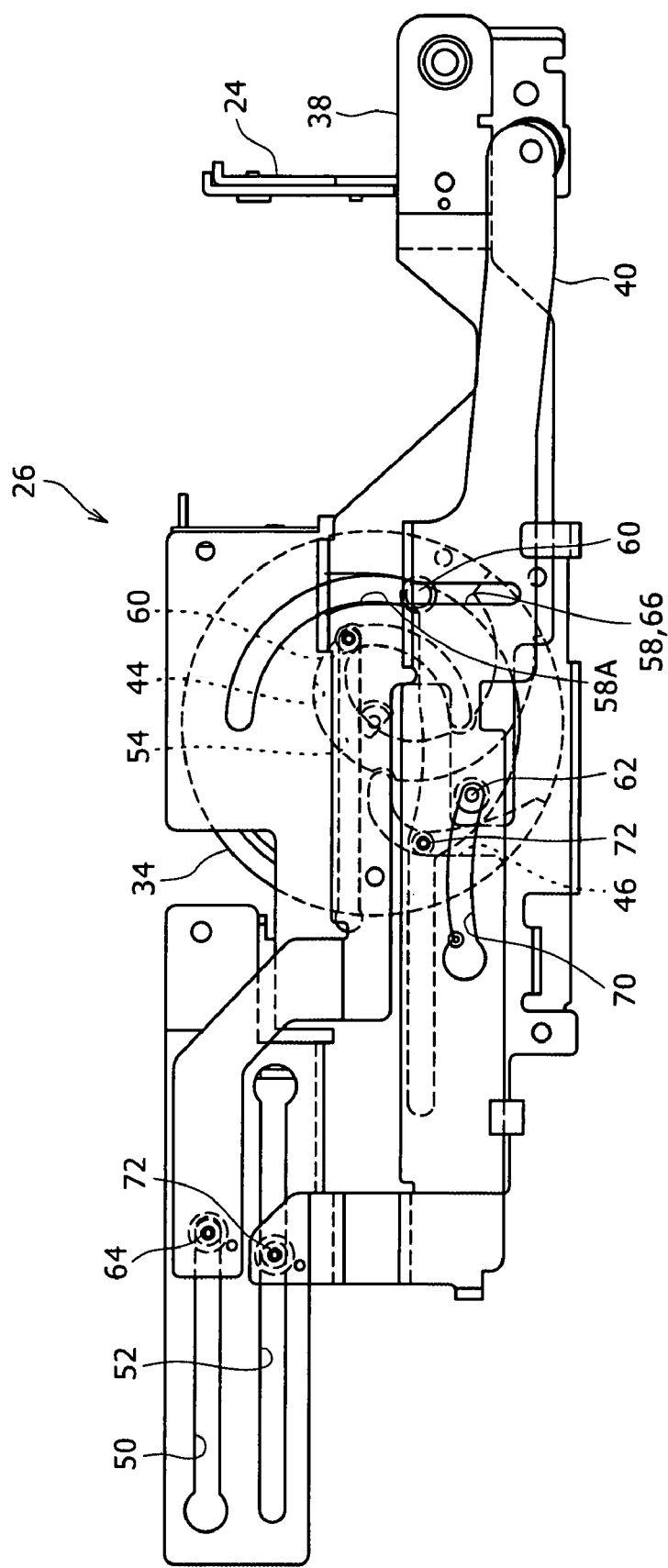
FIG. 16 is an illustration of an operation of the left drive mechanism.

In the left drive mechanism 26, with the motor 30 further rotated normally, as shown in FIG. 16, the forward-rearward movement first cam pin 42 is engaged with the upper end of the forward-rearward movement first cam groove 58 in the left forward-rearward movement arm 38 and with the upper end of the forward-rearward movement first cam groove 66 in the vertical swing arm 40, and the left forward-rearward movement arm 38 and the vertical swing arm 40 are each located at a forwardly moved position thereof.

In addition, the stopping cam pin 60 is located at the front end of the cam groove 54.

Besides, the cam pin 72 of the vertical swing arm 40 is located at an intermediate part in the extending direction of the lower guide groove 52, and the cam pin 62 of the left forward-rearward movement arm 38 is located at the front end of the cam groove 70.

In addition, the cam pin 64 is located at the front end of the upper cam groove 50.

Figure 22:
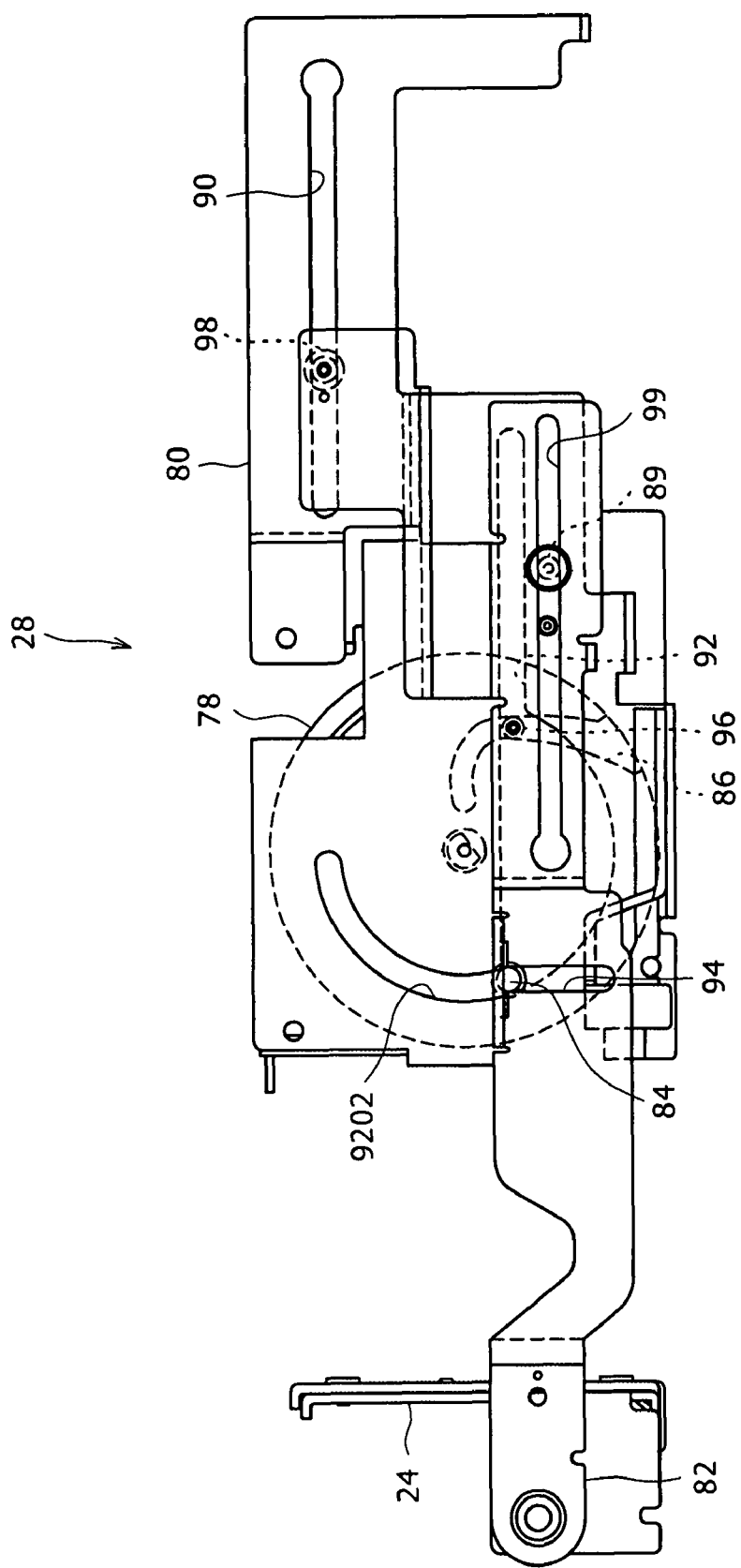
FIG. 22 is an illustration of an operation of the right drive mechanism.

In the right drive mechanism 28, with the motor 74 further rotated normally, as shown in FIG. 22, the forward-rearward movement first cam pin 84 of the cam plate 78 is once moved downward and then moved upwards in the forward-rearward movement first cam groove 94 of the right forward-rearward movement arm 82, and is engaged with the upper end of the forward-rearward movement first cam groove 94, whereby the right forward-rearward movement arm 82 is located in the forwardly moved position thereof.

In addition, the forward-rearward movement second cam pin 96 is located at a location before an arcuate part of the forward-rearward movement second cam groove 86.

Besides, the cam pin 98 is located at an intermediate part in the extending direction of the guide groove 90, and the cam pin 89 is located at an intermediate position in the extending direction of the guide groove 99.

With the left forward-rearward movement arm 38, the right forward-rearward movement arm 82 and the vertical swing arm 40 located in their respective forwardly moved positions, the front panel 16 is located in its forwardly moved position such that its front surface is parallel to the front surface of the casing 20, as shown in FIG. 2.

Incidentally, the rotating amounts of the motors 30 and 74 are controlled by the control unit 1014 so that the moving amounts of the left forward-rearward movement arm 38, the right forward-rearward movement arm 82 and the vertical swing arm 40 from their attached use positions to their forwardly moved positions are equal.

<Transition From First Posture to Second Posture in the Forwardly Moved Position>

With the motor 74 in the right drive mechanism 28 stopped and only the motor 30 in the left drive mechanism 26 is further rotated normally after the arrival of the front panel 16 at the forwardly moved position, the front panel 16 is shifted from the first posture into the second posture.

Figure 17:
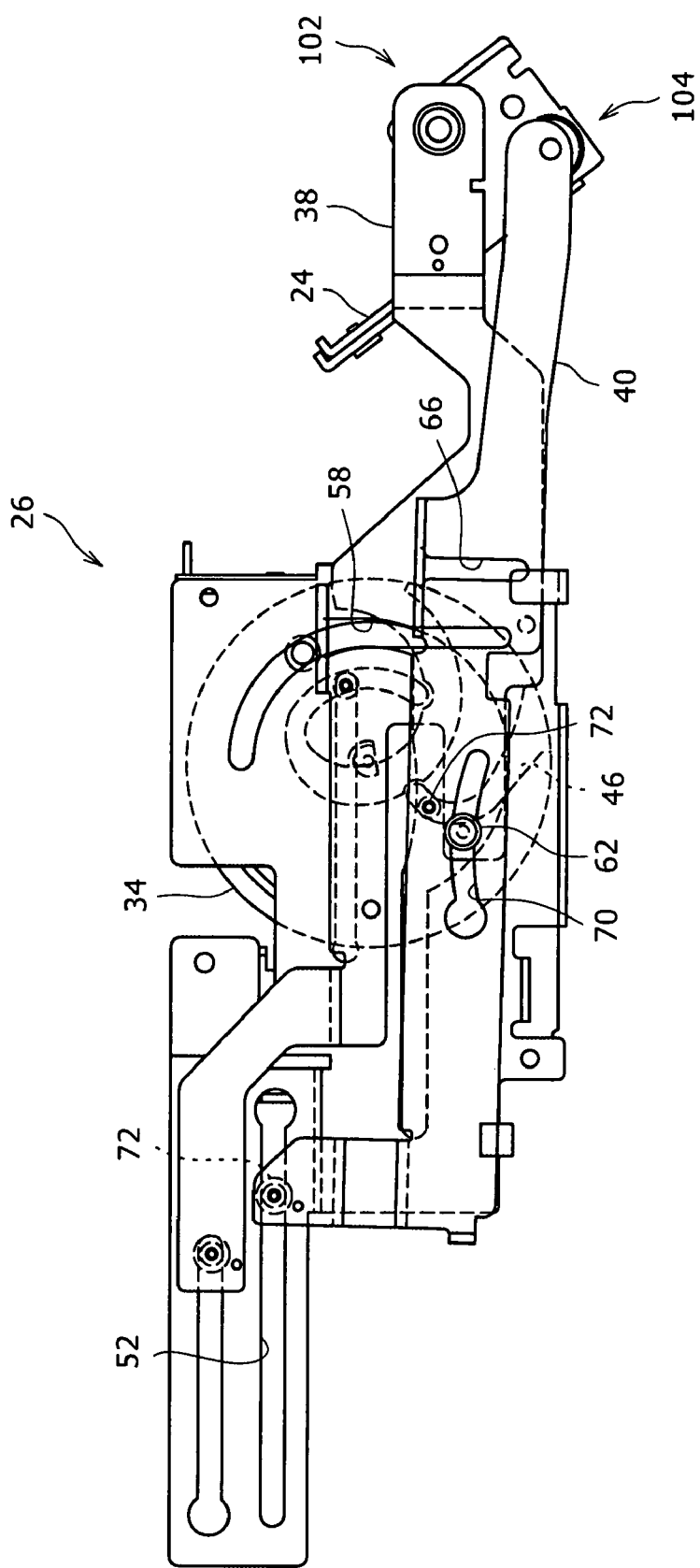
FIG. 17 is an illustration of an operation of the left drive mechanism.
Figure 18:
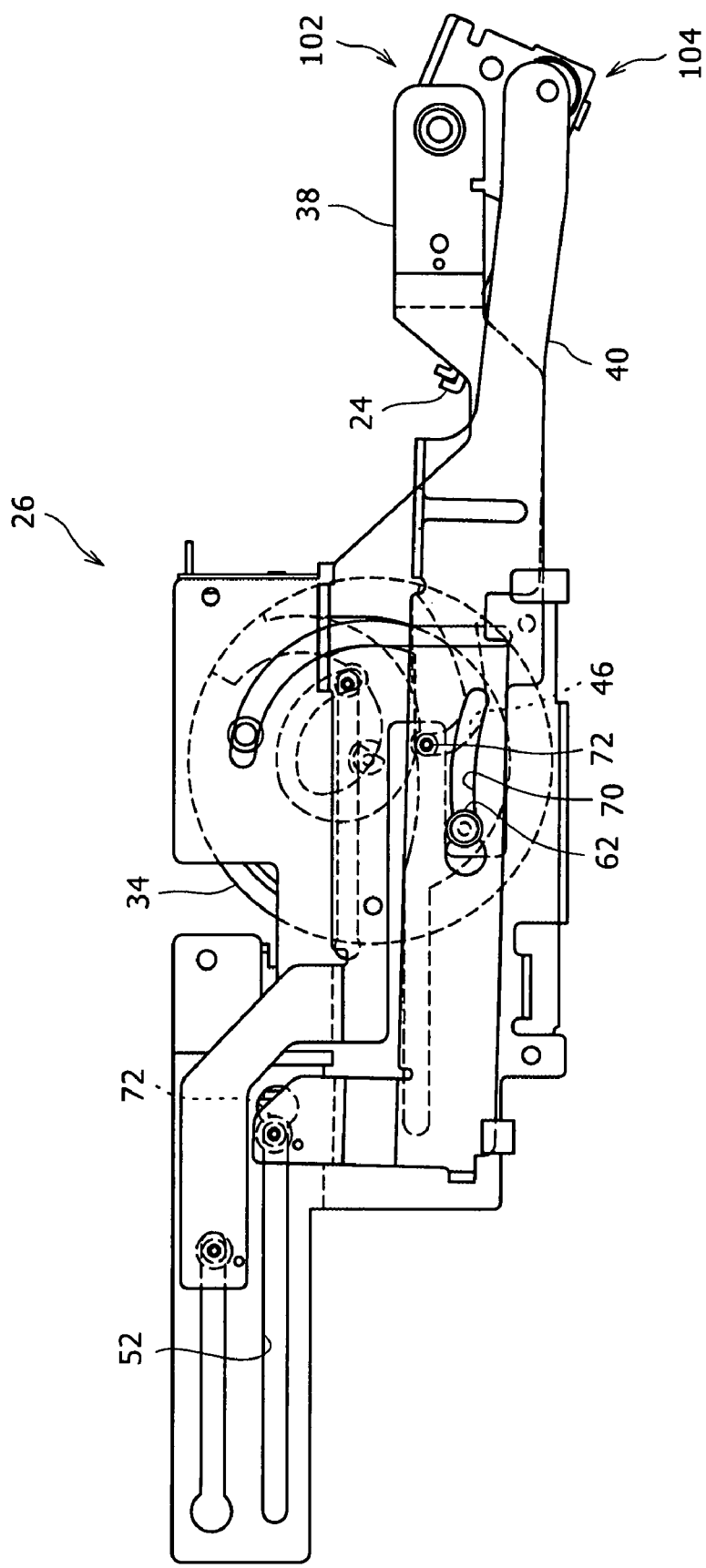
FIG. 18 is an illustration of an operation of the left drive mechanism.

More in detail, in the left drive mechanism 26, as shown in FIGS. 17 and 18, with the cam plate 34 rotated further, the forward-rearward movement first cam pin 42 is disengaged from the upper ends of the forward-rearward movement first cam grooves 58, 66 to the upper side.

In the left forward-rearward movement arm 38, when the forward-rearward movement first cam pin 42 is disengaged from the forward-rearward movement first cam groove 58, the stopping cam pin 60 is engaged with the arcuate part of the stopping cam groove 44, so that the left forward-rearward movement arm 38 remains in its forwardly moved position even if the cam plate 34 is further rotated.

In the vertical swing arm 40, when the forward-rearward movement first cam pin 42 is disengaged from the forward-rearward movement first cam groove 66, the vertical swing cam pin 68 is engaged with the vertical swing cam groove 46, and the vertical swing arm 40 is moved forwards attendant on the rotation of the cam plate 34.

Specifically, in the left drive mechanism 26, the left forward-rearward movement arm 38 remains in its forwardly moved position, and only the vertical swing arm 40 is moved forwards.

Figure 23:
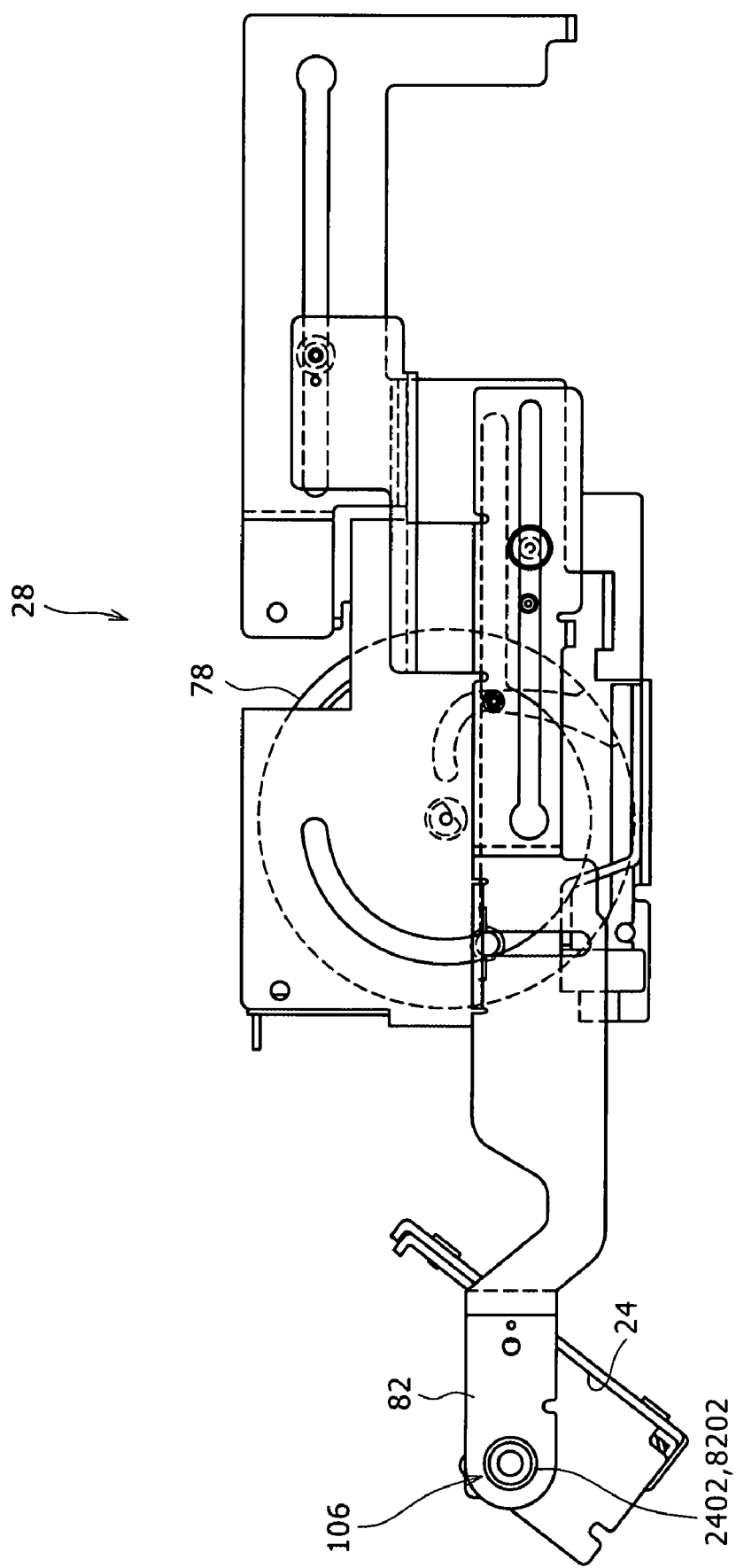
FIG. 23 is an illustration of an operation of the right drive mechanism.
Figure 24:
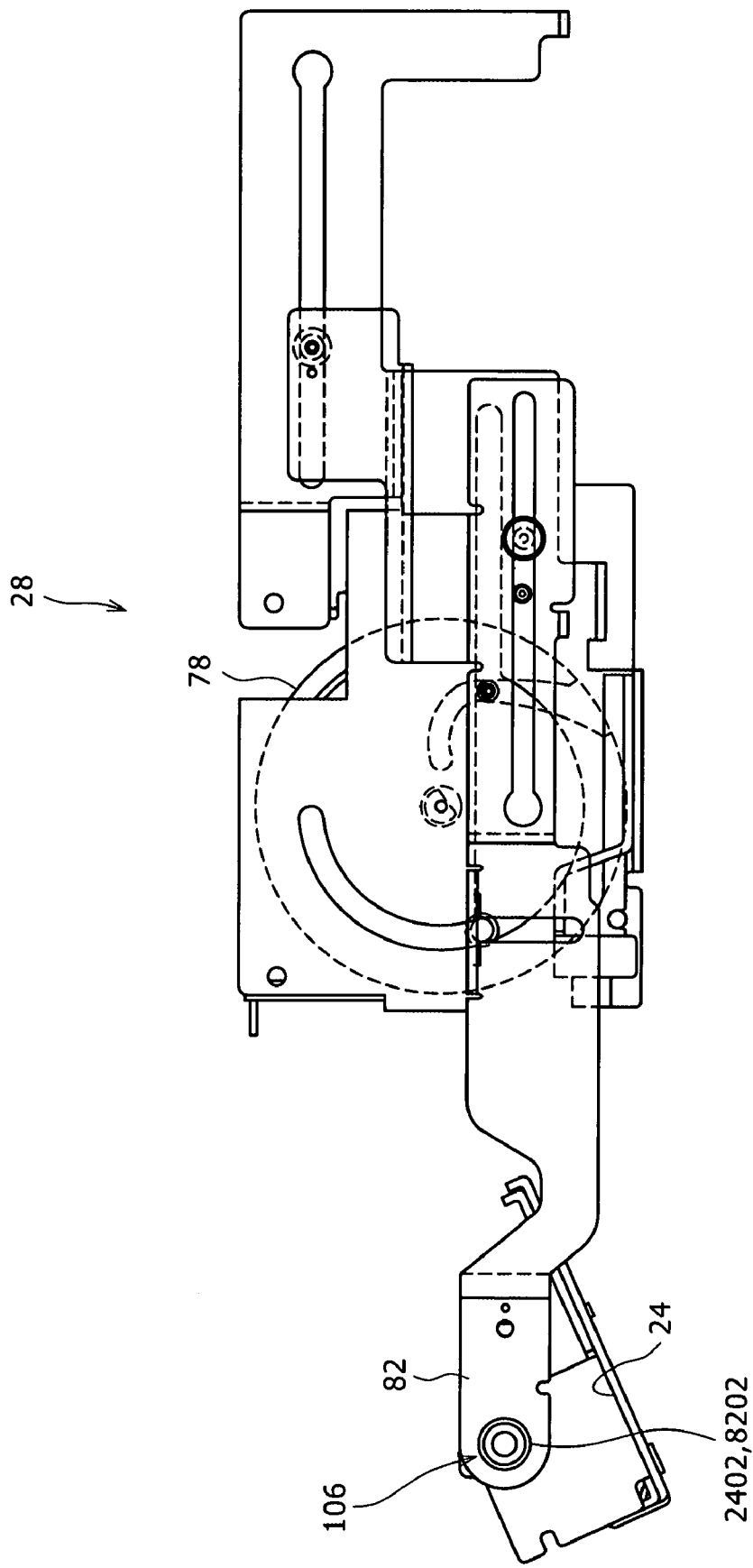
FIG. 24 is an illustration of an operation of the right drive mechanism.

On the other hand, in the right drive mechanism 28, the motor 74 is stopped, as shown in FIGS. 23 and 24, so that the cam plate 78 is not rotated, and the right forward-rearward movement arm 82 remains in its forwardly moved position.

With only the vertical swing arm 40 moved forwards, the holder 24 is swung upwards with the location of the first and third ball joints 102, 106 as a center, resulting in the condition where the holder 24 is directed skewly upwards. As shown in FIG. 3, the front panel 16 is in its second posture such that its front surface faces skewly upwards, and the disk-formed recording medium can be loaded and unloaded through the loading/unloading gate 22.

Besides, when the motor 30 of the left drive mechanism 26 is rotated reversely in the condition where the front panel 16 is in the second posture, only the vertical swing arm 40 is retracted in motions reverse to the above-mentioned, whereby the front panel 16 is returned from the second posture into the first posture.

Incidentally, with the motors 30, 74 in the left and right drive mechanism 26, 28 rotated reversely when the front panel 16 is returned into the first posture at its forwardly moved position, the front panel 16 is returned from the forwardly moved position to the attached use position through motions reverse to the above-mentioned motions.

<From Attached Use Position to Left Inclined Use Position>

Figure 19:
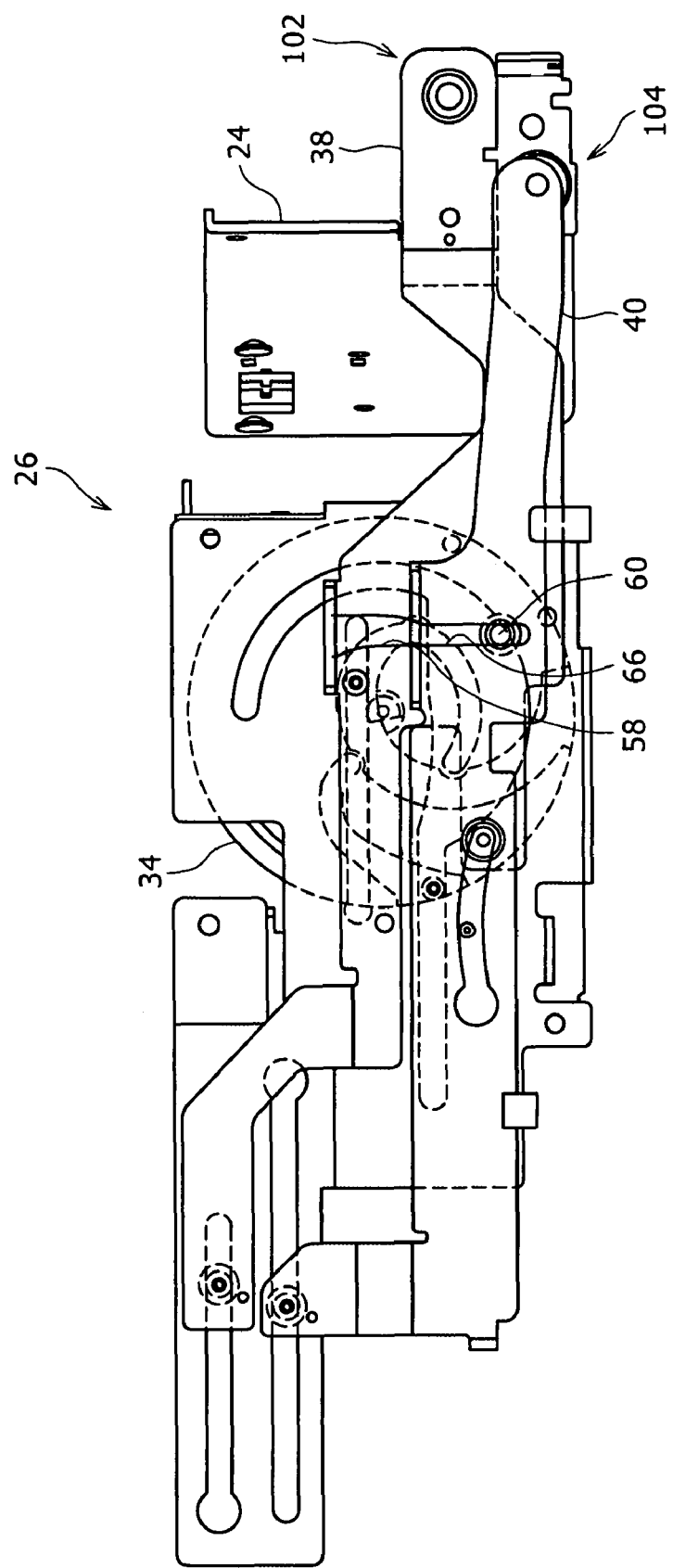
FIG. 19 is an illustration of an operation of the left drive mechanism.
Figure 20:
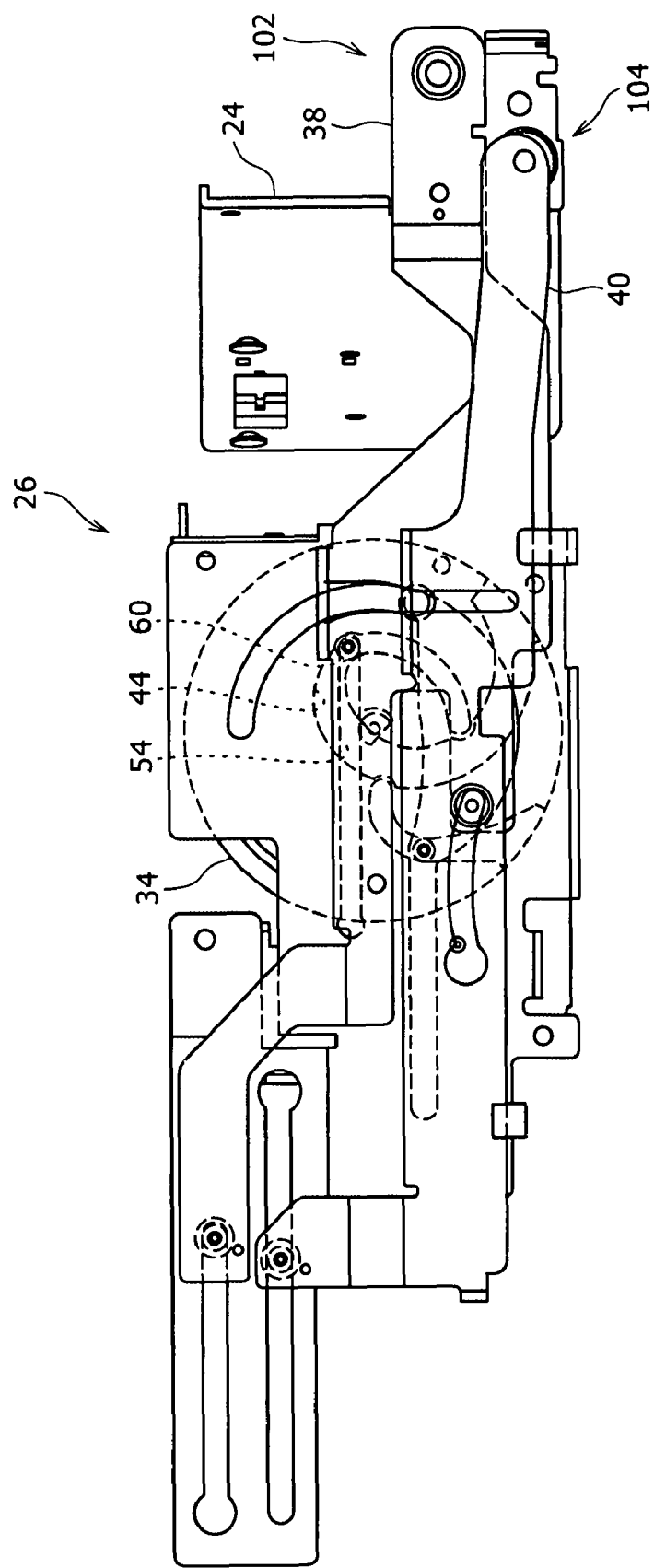
FIG. 20 is an illustration of an operation of the left drive mechanism.

In addition, when only the motor 30 in the left drive mechanism 26 is rotated normally in the condition where the front panel 16 is located in the attached use position shown in FIG. 1, the left forward-rearward movement arm 38 and the vertical swing arm 40 are moved forwards through the functions of the forward-rearward movement first cam pin 42 and the forward-rearward movement first cam grooves 58, 66 as shown in FIG. 19. Then, when the left forward-rearward movement arm 38 and the vertical swing arm 40 reach their forwardly moved positions as shown in FIG. 20, the motor 30 is stopped.

Figure 4A:
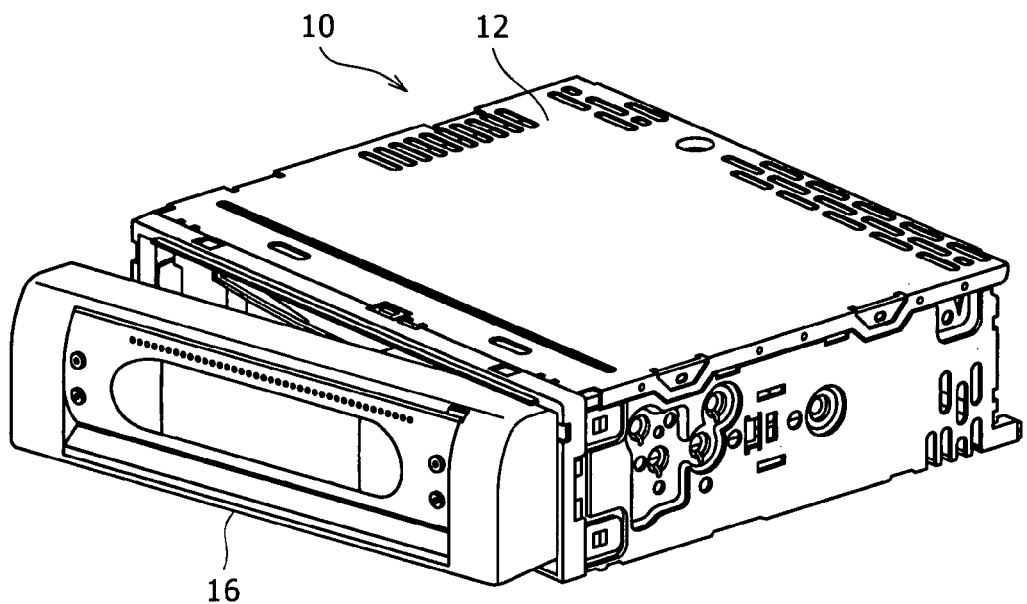
FIG. 4A is a perspective view showing the condition where the front panel of the in-vehicle apparatus is in a left inclined use position.

In this condition, as shown in FIG. 4A, the front panel 16 is in its inclined use position where its left side part is projected relative to its right side part, with the third ball joint 106 as a fulcrum. In other words, the front panel 16 is in the left inclined use position where its left side part projects to the front side while its right side part remains in the attached use position. In this condition, it is ensured in this embodiment that the operating members 14 can be easily operated by the user seated on the driver's seat.

Incidentally, when the motor 30 in the left drive mechanism 26 is rotated normally in the condition where the front panel 16 is located at its left inclined use position shown in FIG. 4A, the left forward-rearward movement arm 38 and the vertical swing arm 40 are retracted through motions reverse to the above-mentioned, whereby the front panel 16 is returned into its attached use position shown in FIG. 1.

<From Attached Use Position to Right Inclined Use Position>

Figure 25:
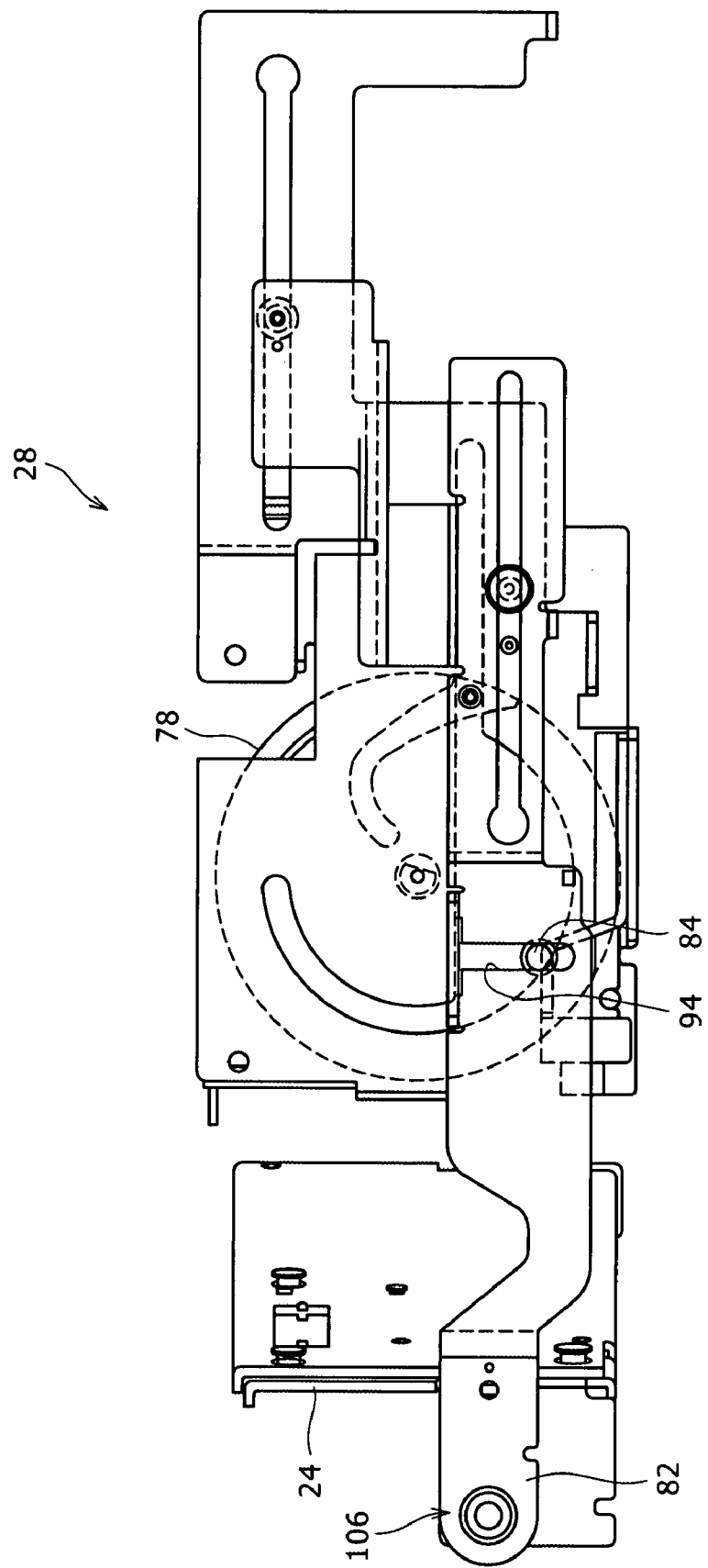
FIG. 25 is an illustration of an operation of the right drive mechanism.
Figure 26:
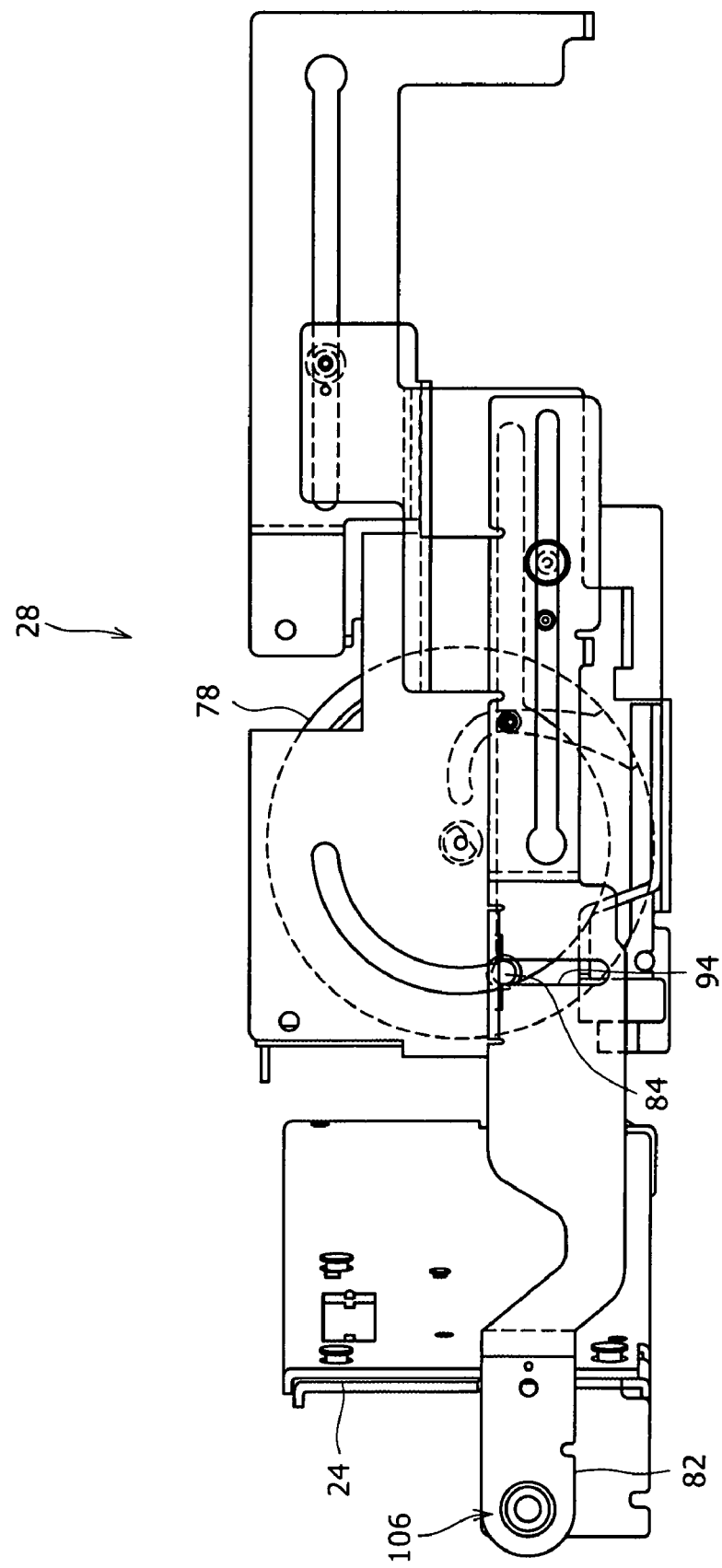
FIG. 26 is an illustration of an operation of the right drive mechanism.

In addition, when only the motor 74 in the right drive mechanism 28 is rotated normally in the condition where the front panel 16 is located in the attached use position shown in FIG. 1, the right forward-rearward movement arm 82 is moved forwards through the functions of the forward-rearward movement first cam pin 84 and the forward-rearward movement first cam groove 94 as shown in FIG. 25. Then, when the right forward-rearward movement arm 82 reaches its forwardly moved position, the motor 74 is stopped.

Figure 4B:
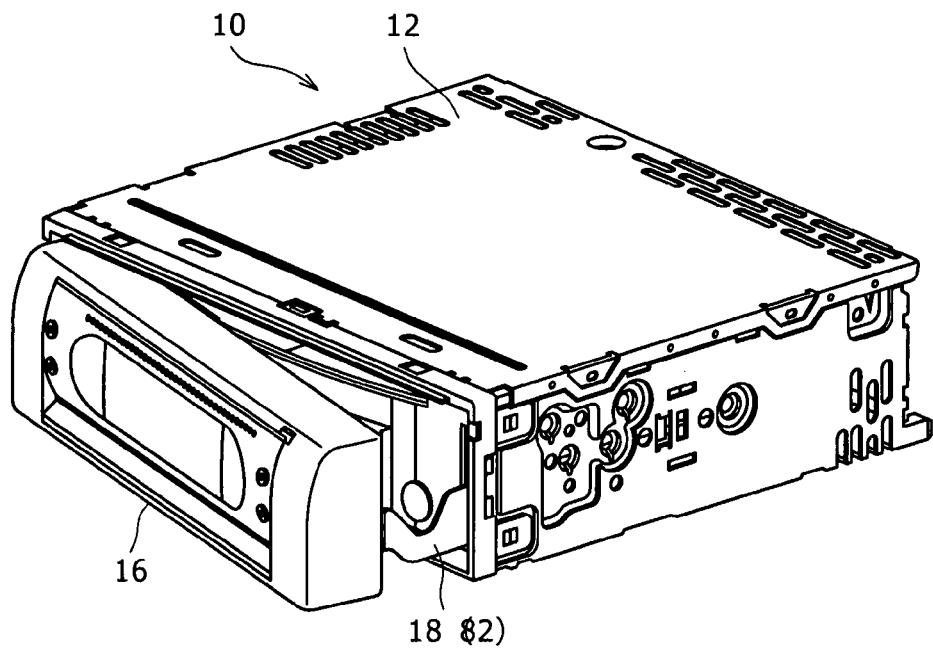
FIG. 4B is a perspective view showing the condition where the front panel of the in-vehicle apparatus is in a right inclined use position.

In this condition, as shown in FIG. 4B, the front panel 16 is in its inclined use position where its right side part is projected relative to its left side part, with the first ball joint 102 as a fulcrum. In other words, the front panel 16 is in the right inclined use position where its right side part projects to the front side while its left side part remains in the attached use position. In this condition, it is ensured in this embodiment that the operating members 14 can be easily operated by the user seated on the assistant driver's seat.

Incidentally, when the motor 74 in the right drive mechanism 28 is rotated reversely in the condition where the front panel 16 is in the right inclined use position shown in FIG. 4B, the right forward-rearward movement arm 82 is retracted through motions reverse to the above-mentioned, whereby the front panel 16 is returned into the attached use position shown in FIG. 1.

<Transition From First Posture to Second Posture at Forwardly Moved Position, to Attain Left Inclined Use Position>

When only the motor 74 in the right drive mechanism 28 is rotated reversely in the condition where the front panel 16 is located at the forwardly moved position and is in the second posture, as described above, the front panel 16 is set directly into the left inclined use position while assuming the second posture.

Figure 5A:
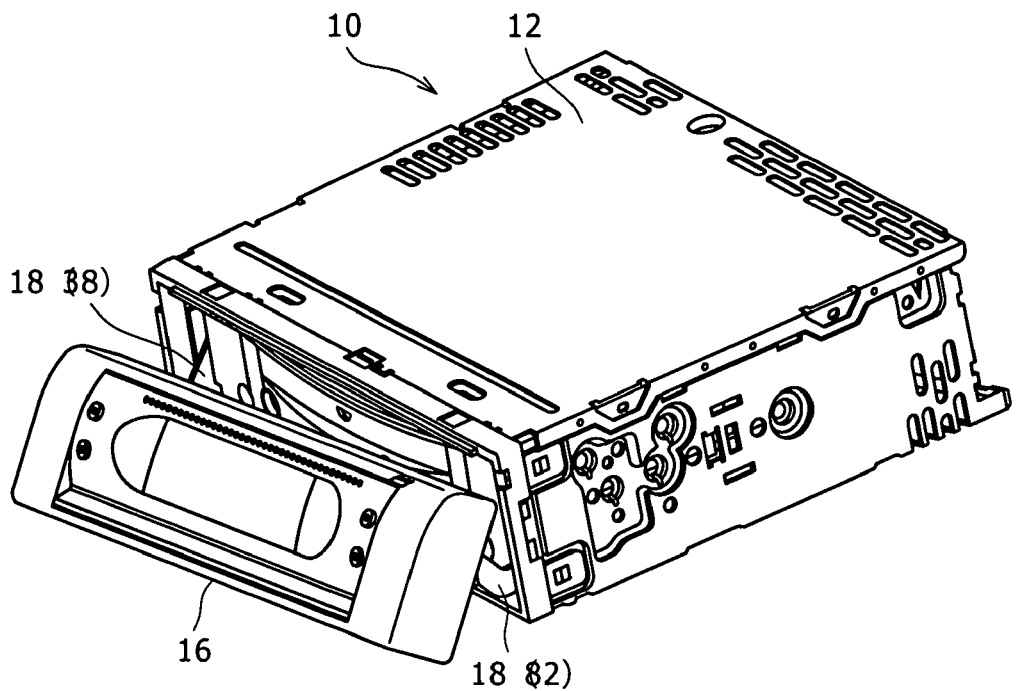
FIG. 5A is a perspective view showing the condition where the front panel of the in-vehicle apparatus is in a second posture at the left inclined use position.
Figure 27:
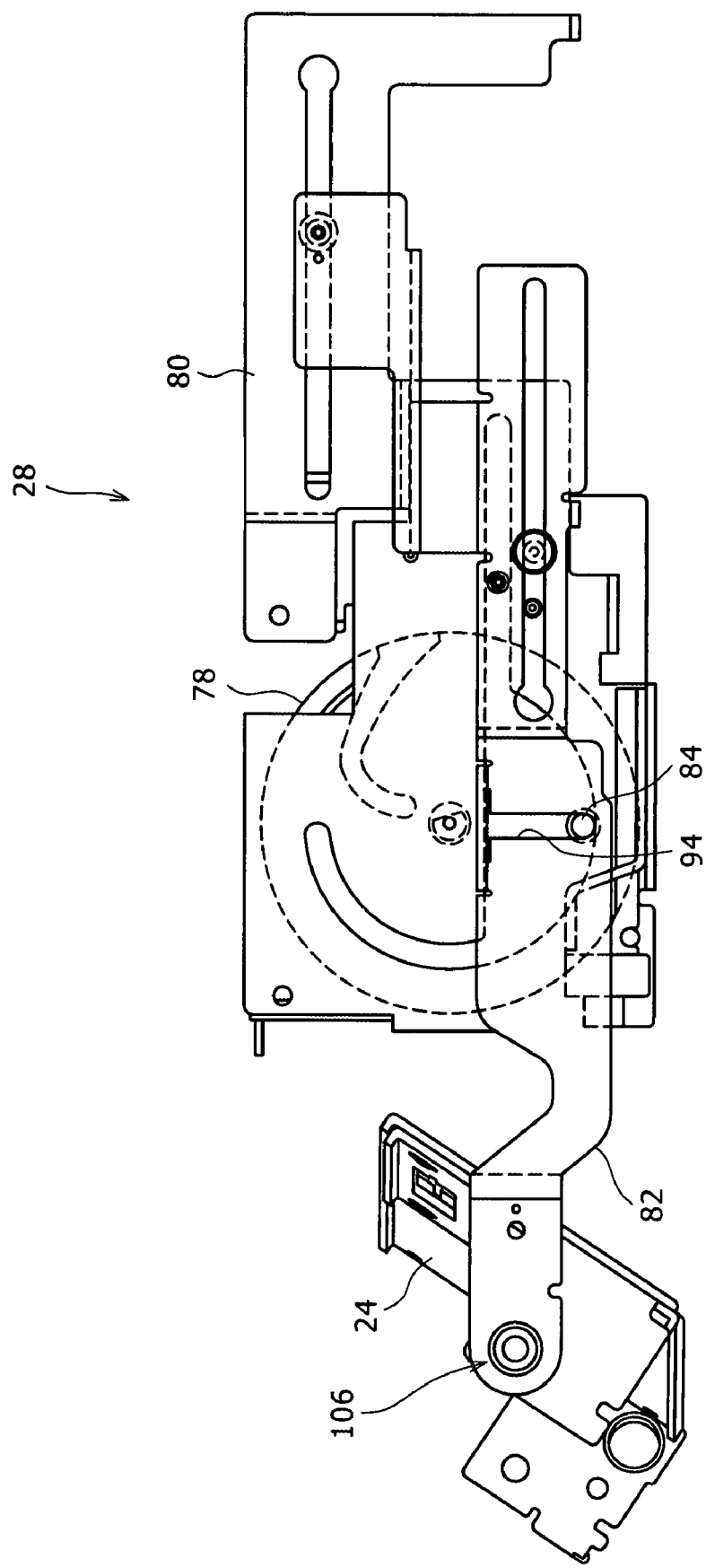
FIG. 27 is an illustration of an operation of the right drive mechanism.

Specifically, when the motor 74 is rotated reversely, the forward-rearward movement second cam pin 96 is moved downwards in the forward-rearward movement cam groove 94, and the right forward-rearward movement arm 82 is retracted and then stopped at a location on the front side of the attached use position, resulting in the left inclined use position where the left side part of the front panel 16 is projected relative to the right side part, as shown in FIGS. 5A and 27.

In the condition where the front panel 16 is located in the left inclined use position while being in the second posture, the operating members 14 can be more easily operated by the user seated on the driver's seat. Besides, in this condition, the disk-formed recording medium can be loaded and unloaded through the loading/unloading gate 22.

Incidentally, when the motor 74 in the right drive mechanism 28 is rotated normally in the condition where the front panel 16 is located at the left inclined use position in the second posture, the right forward-rearward movement arm 82 is moved forwards through motions reverse to the above-mentioned, whereby the front panel 16 is returned into the forwardly moved position while assuming the second posture.

<Transition From First Posture to Second Posture at Forwardly Moved Position, to Attain Right Inclined Use Position>

When only the motor 74 in the right drive mechanism 28 is rotated normally in the condition where the front panel 16 is located in the forwardly moved position and is in the second posture, as described above, the front panel 16 is put into the right inclined use position while assuming the second posture.

Figure 28:
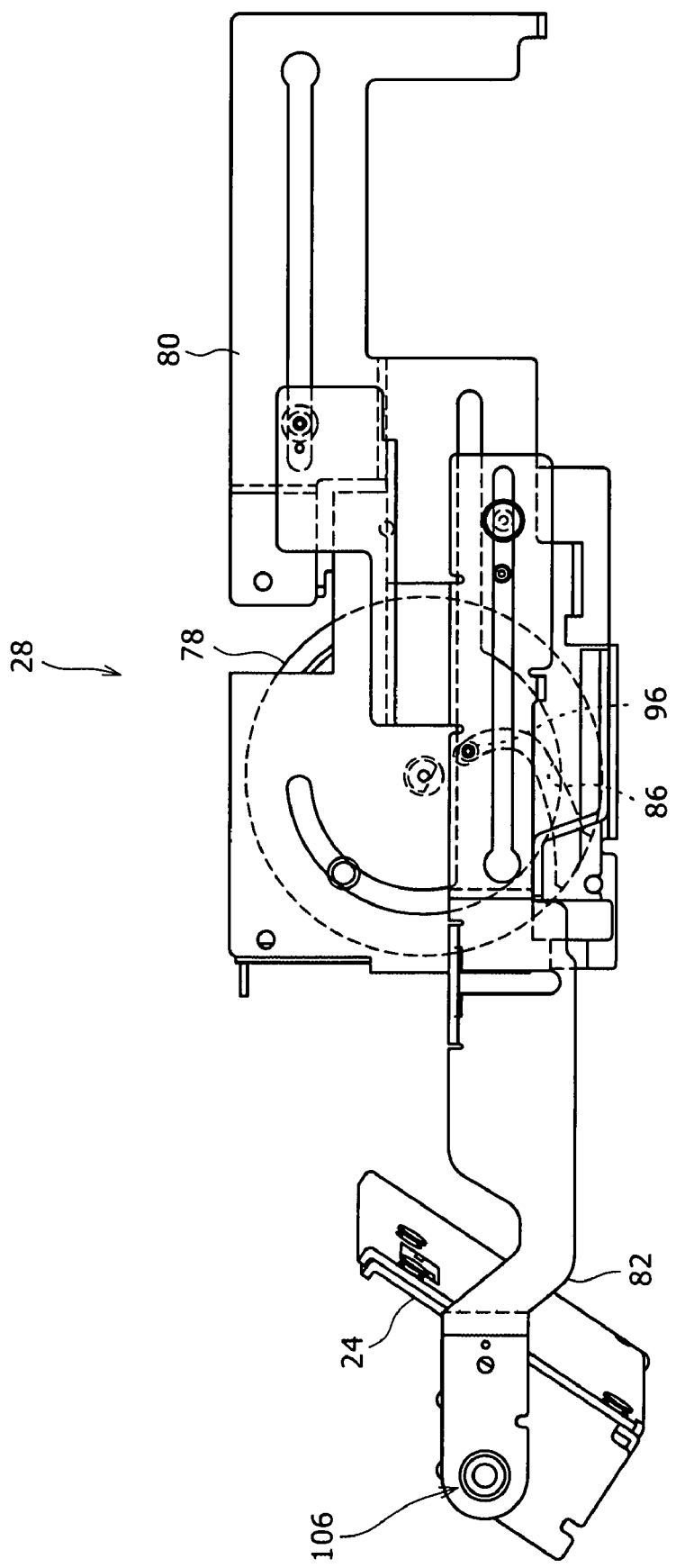
FIG. 28 is an illustration of an operation of the right drive mechanism.

Specifically, when the motor 74 of the right drive mechanism 28 is rotated normally, as shown in FIG. 28, the forward-rearward movement first cam pin 84 is disengaged from the upper end of the forward-rearward movement cam groove 94, and, simultaneously the forward-rearward movement second cam pin 96 is engaged with the forward-rearward movement second cam groove 86, so that the right forward-rearward movement arm 82 is moved forwards by the normal rotation of the cam plate 78.

Figure 5B:
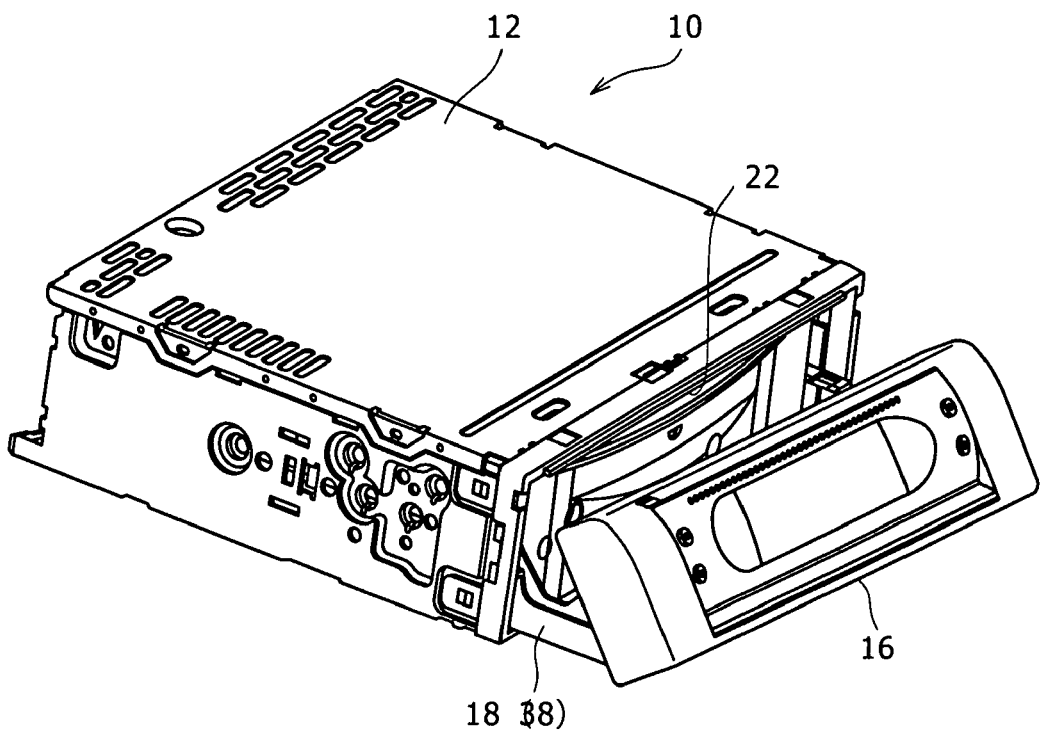
FIG. 5B is a perspective view showing the condition where the front panel of the in-vehicle apparatus is in a second posture at the right inclined use position.
Figure 6:
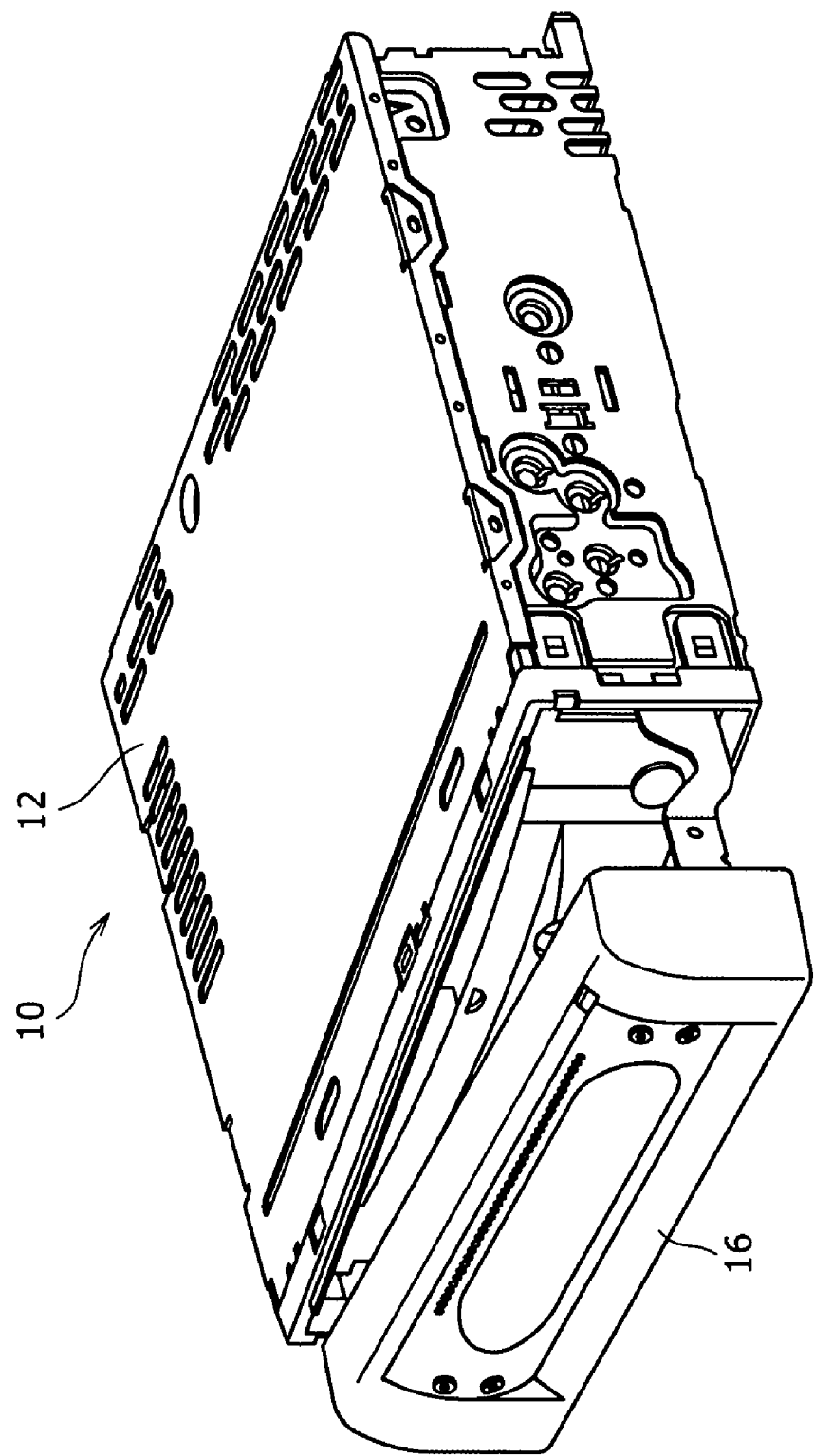
FIG. 6 is a perspective view showing the condition where the front panel of the in-vehicle apparatus is in the left inclined use position.
Figure 7:
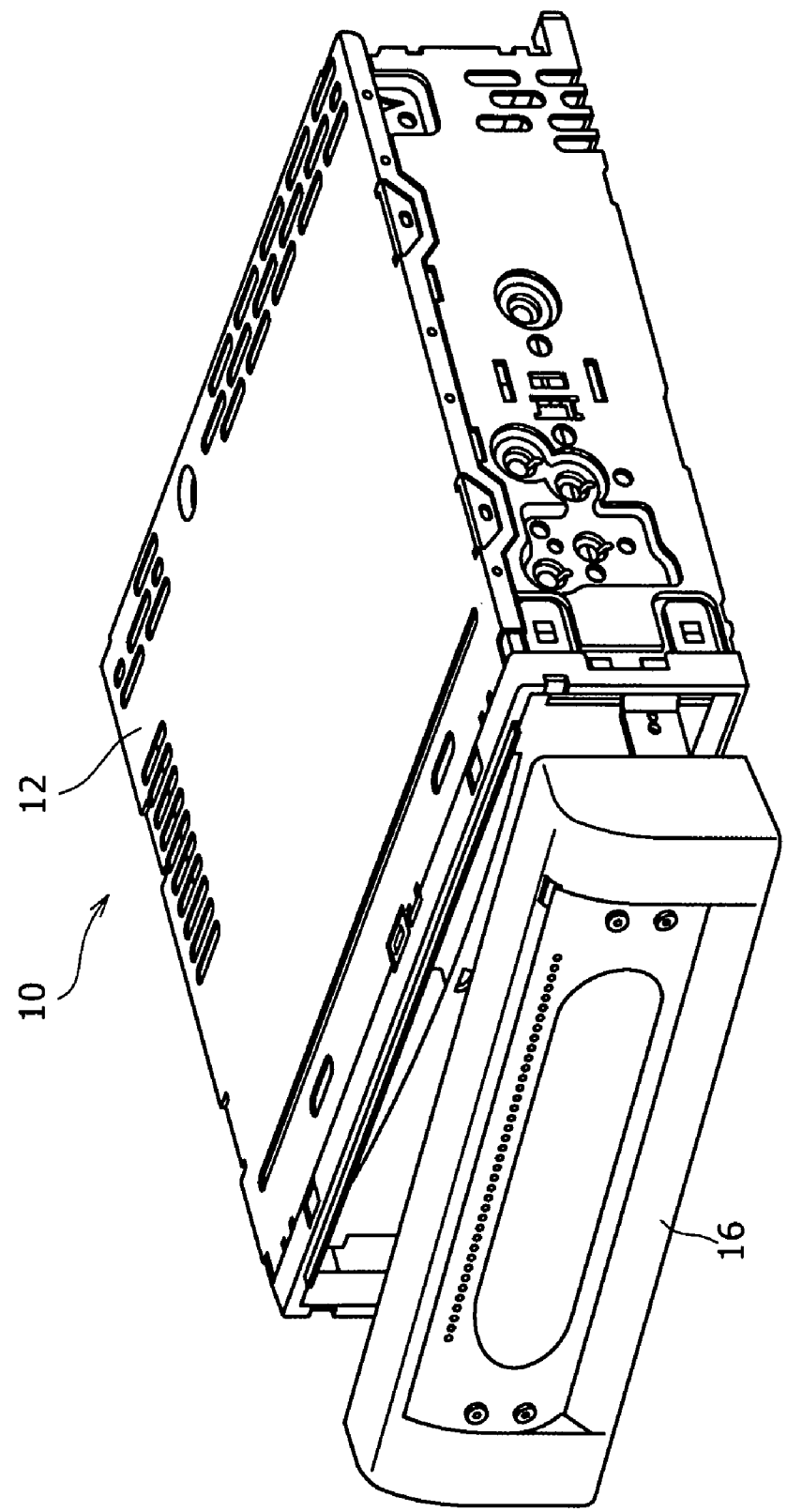
FIG. 7 is a perspective view showing the condition where the front panel of the in-vehicle apparatus is in the right inclined use position.
Figure 29:
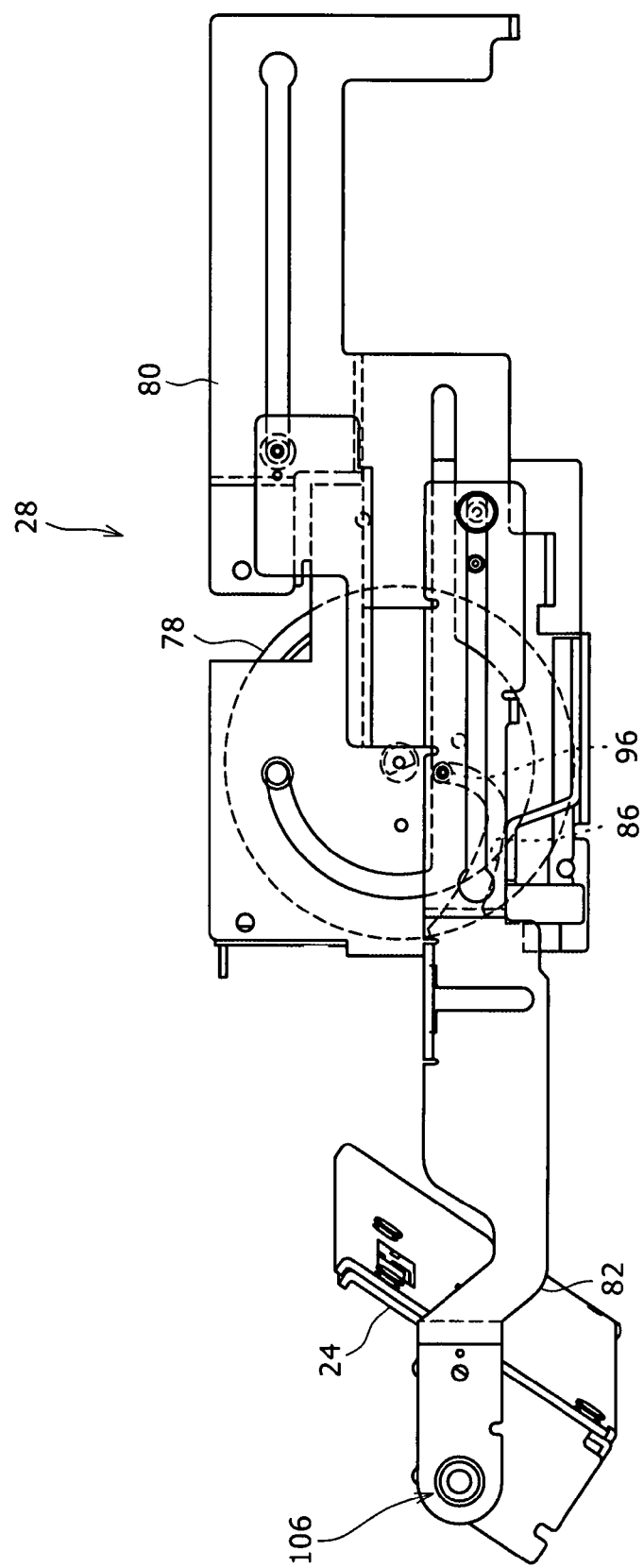
FIG. 29 is an illustration of an operation of the right drive mechanism.

At the time when the right forward-rearward movement arm 82 is projected by a predetermined amount from the forwardly moved position, as shown in FIG. 29, the forward-rearward movement second cam pin 96 reaches an inner end part of the forward-rearward movement second cam groove 86, and the motor 74 is stopped, whereby the front panel 16 is set in the right inclined use position where the right side part of the front panel 16 is projected relative to the left side part, as shown in FIG. 5B.

When the front panel 16 is thus put in the right inclined use position while assuming the second posture, the operating members 14 can be more easily operated by the user seated on the assistant drive's seat. In addition, in this condition, the disk-formed recording medium can be loaded and unloaded through the loading/unloading gate 22.

Incidentally, when the motor 74 in the right drive mechanism 28 is rotated reversely in the condition where the front panel 16 is located at the right inclined use position while assuming the second posture, the right forward-rearward movement arm 82 is retracted through motions reverse to the above-mentioned. When the motor 30 in the left drive mechanism 26 is rotated reversely, the vertical swing arm 40 is retracted through motions reverse to the above-mentioned, whereby the front panel 16 is returned into the forwardly moved position while keeping the second posture.

<Setting Into Left Inclined Use Position at Forwardly Moved Position, Followed by Transition From First Posture to Second Posture>

When only the motor 74 in the right drive mechanism 28 is rotated reversely in the condition where the front panel 16 is located in the forwardly moved position and is in the first posture, as described above, the front panel 16 is brought to the left inclined use position while assuming the first posture.

Specifically, when the motor 74 is rotated reversely, the forward-rearward movement second cam pin 96 is moved downwards in the forward-rearward movement cam groove 94, and the right forward-rearward movement arm 82 is retracted and stopped at a location on the front side of the attached use position, resulting in the left inclined use position where the left side part of the front panel 16 is projected relative to the right side part, as shown in FIGS. 5A and 27.

In the condition where the front panel 16 is thus located in the left inclined use position, the operating members 14 can be easily operated by the user seated on the driver's seat.

Incidentally, when the motor 74 is rotated normally here, the front panel 16 is returned from the left inclined use position into the forwardly moved position through motions reverse to the above-mentioned.

When only the motor 30 in the left drive mechanism 26 is further moved forwards in the condition where the front panel 16 is located in the left inclined use position, as described above, the front panel 16 is transferred from the first posture into the second posture, and, when the motor 30 in the left drive mechanism 26 is rotated reversely, the front panel 16 is returned into the first posture.

When the front panel 16 is transferred into the second posture at the left inclined use position, the operating members 14 can be more easily operated by the user seated on the driver's seat. Besides, in this condition, the disk-formed recording medium can be loaded and unloaded through the loading/unloading gate 22.

<Setting Into Right Inclined Use Position at Forwardly Moved Position, Followed by Transition From First Position to Second Position>

When only the motor 74 of the right drive mechanism 28 is rotated normally in the condition where the front panel 16 is located in the forwardly moved position and is in the first posture, as described above, the front panel 16 is put into the right inclined use position while keeping the first posture.

Specifically, when the motor 74 is rotated normally, as shown in FIG. 28, the forward-rearward movement first cam pin 84 is disengaged from the upper end of the forward-rearward movement cam groove 94, and, simultaneously, the forward-rearward movement second cam pin 96 is engaged with the forward-rearward movement second cam groove 86. In this case, with the cam plate 78 rotated normally, the right forward-rearward movement arm 82 is moved forwards and is stopped at a location on the front side of the forwardly moved position, resulting in the right inclined use position where the right side part of the front panel 16 is projected relative to the left side part, as shown in FIGS. 5B and 29.

When the front panel 16 is thus located in the right inclined use position, the operating members 14 can be easily operated by the user seated on the assistant driver's seat.

Incidentally, when the motor 74 is rotated reversely in this condition, the front panel 16 is returned from the right inclined use position into the forwardly moved position.

When only the motor 30 of the left drive mechanism 26 is further rotated normally in the condition where the front panel 16 is located in the right inclined use position, as described above, the front panel 16 is transferred from the first posture into the second posture, and, when the motor 30 in the left drive mechanism 26 is rotated reversely, the front panel 16 is returned into the first posture.

When the front panel 16 is transferred into the second posture at the right inclined use position, the operating members 14 can be more easily operated by the user seated on the assistant driver's seat. In addition, in this condition, the disk-formed recording medium can be loaded and unloaded through the loading/unloading gate 22.

As has been described above, according to the present embodiment, the front panel 16 is moved to the inclined use position where one of the left and right side parts of the front panel 16 projects more forwards relative to the front surface of the apparatus body 12 than the other. Therefore, irrespective of the place where the apparatus body 12 is installed, the front surface of the front panel 16 is made to face toward the user, so that the operating members 14 can be easily operated by the user, which is advantageous for enhancing the convenience in use.

In addition, in this embodiment, the front panel 16 can be shifted between the first posture and the second posture, so that the operating members 14 can be more easily operated by the user, which is more advantageous for enhancing the convenience in use.

Besides, in this embodiment, the vertical swing arm 40 is moved in the front-rear direction through the functions of the forward-rearward movement first cam pin 42, the forward-rearward movement first cam groove 66 and the vertical swing cam pin 68. Therefore, notwithstanding the single cam plate 78 is used, a large forward/rearward stroke is secured for the vertical swing arm 40, which is advantageous for making the left drive mechanism 26 compact.

In addition, in this embodiment, the right forward-rearward movement arm 82 is moved in the front-rear direction through the functions of the forward-rearward movement first cam pin 84, the forward-rearward movement cam groove 94, the forward-rearward movement second cam pin 96 and the forward-rearward movement second cam groove 86. Therefore, notwithstanding the single cam plate 78 is used, a large forward/rearward stroke is secured for the right forward-rearward movement arm 82, which is advantageous for making the right drive mechanism 28 compact.

Incidentally, the manner in which the front panel 16 is moved between the attached use position, the forwardly moved position, the left inclined use position, the right inclined use position, the first posture and the second posture by the left drive mechanism 26 and the right drive mechanism 28 is set arbitrarily.

For example, a configuration may be adopted in which the front panel 16 is moved from the attached use position to the forwardly moved position and shifted from the first posture into the second posture by depressing an open/close button 14A. In addition, a configuration may be adopted in which the front panel 16 is returned from the second posture into the first posture and returned from the forwardly moved position to the attached use position by depressing the open/close button 14A in the condition where the front panel 16 is located at the forwardly moved position and is in the second posture.

Or, a configuration may be adopted in which with a left normal rotation button 14B depressed, the motor 30 in the left drive mechanism 26 is rotated normally, whereby the front panel 16 is moved to the left inclined use position, and, with a left reverse rotation button 14C depressed, the motor 30 is rotated reversely, whereby the front panel 16 is returned into the attached use position.

Or, a configuration may be adopted in which with a right normal rotation button 14D depressed, the motor 74 in the right drive mechanism 28 is rotated normally, whereby the front panel 16 is moved to the right inclined use position, and, with a right reverse rotation button 14E depressed, the motor 74 is rotated reversely, whereby the front panel 16 is returned into the attached use position.

Or, a configuration may be adopted in which a left inclined use position operating button is provided so that, with the operating button depressed, the front panel 16 is moved forwards from the attached use position to the forwardly moved position, then the right forward-rearward movement arm 82 is retracted from the forwardly moved position to bring the front panel 16 into the left inclined use position, and, with the operating button depressed again, the front panel 16 is returned into the attached use position.

Or, a configuration may be adopted in which a right inclined use position operating button is provided so that, with the operating button depressed, the front panel 16 is moved forwards from the attached use position to the forwardly moved position, then the right forward-rearward movement arm 82 is moved forwards to bring the front panel 16 into the right inclined use position, and, with the operating button depressed again, the front panel 16 is returned into the attached use position.

Incidentally, while the present invention has a characteristic in that the front panel 16 is put into the inclined use position to thereby make it easy for the user seated on the driver's seat or the user seated on the assistant driver's seat to operate the operating members 14 at the front panel 16, and invention has no characteristic in the configurations of the left drive mechanism 26 and the right drive mechanism 28 themselves. For example, the left drive mechanism 26 and the right drive mechanism 28 may be so configured that the left and right forward-rearward movement arms 38 and 82 are moved in the front-rear direction through the functions of individual motors, pinions rotated by the motors, and racks meshed with the pinions, and that the vertical swing arm 40 is moved in the front-rear direction through the functions of an individual motor, a pinion rotated by the motor, and a rack meshed with the pinion. Further, the configuration for moving the left and right forward-rearward movement arms 38 and 82 and the vertical swing arm 40 in the front-rear direction is not limited to that in the above-described embodiment, and there may be used various known configurations for converting a rotating motion of a motor into a rectilinear motion. Furthermore, in the case where a direct acting type actuator such as solenoid and linear motor is used in place of the above-mentioned motor as an actuator, there may be considered a configuration in which, for example, three such actuators are prepared and they are coupled directly to the left and right forward-rearward movement arms 38 and 82 and the vertical swing arm 40, respectively. It is to be noted here, however, that the adoption of the configuration according to the above-described embodiment promises large forward/rearward strokes for the arms moved in the front-rear direction by a single cam plate, which is advantageous for attaining a compact configuration.

Besides, while the case the in-vehicle apparatus 10 is a car audio system has been described in the above embodiment, the in-vehicle apparatus can naturally be applied to other kinds of in-vehicle apparatuses, such as car navigation system.

It should be understood by those skilled in the art that various modifications, combinations, sub-combinations and alterations may occur depending on design requirements and other factors insofar as they are within the scope of the appended claims or the equivalents thereof.

What is claimed is:

1. An in-vehicle apparatus, comprising:
    an apparatus body installed in a vehicle compartment including a reproduction unit for reproduction of data recorded on a recording medium, the reproduction unit being provided at a front surface of the apparatus body with a loading/unloading gate for loading and unloading said recording medium therethrough;
    a front panel disposed at the front surface of said apparatus body and provided with an operating member for operating said apparatus body; and
    a drive mechanism connecting said apparatus body and said front panel, said drive mechanism being operative to support said front panel in a first posture such that a front surface of said front panel is parallel to said front surface of said apparatus body,
    wherein said reproduction unit reproduces audio data recorded on a disk-formed recording medium and outputs an audio signal, said apparatus body being provided with an audio output unit for applying a predetermined signal processing to said audio signal outputted from said reproduction unit and for supplying the processed signal to an audio output unit,
    wherein said drive mechanism moves said front panel between an attached use position where said front panel is attached to said front surface of said apparatus body and an inclined use position where one of left and right side parts of said front panel projects more forwards relative to said front surface of said apparatus body than the other,
    wherein said drive mechanism includes a left drive mechanism provided at a left side part of said apparatus body and connected to a left side part of said front panel, and a right drive mechanism provided at a right side part of said apparatus body and connected to a right side part of said front panel,
    wherein said left drive mechanism includes a left forward-rearward movement arm which extends in the front-rear direction at a left side part of said apparatus body, the front end of which is connected to a left side part of said front panel and which is moved forwards and rearwards,
    wherein said right drive mechanism includes a right forward-rearward movement arm which extends in the front-rear direction at a right side part of said apparatus body, the front end of which is connected to a left side part of said front panel and which is moved forwards and rearwards,
    wherein one of said left drive mechanism and said right drive mechanism is provided with a vertical swing arm which extends in the front-rear direction, the front end of which is connected to said front panel and which is moved forwards and rearwards,
    wherein said left forward-rearward movement arm, said right forward-rearward movement arm and said vertical swing arm are located in forwardly moved positions spaced by equal distances from a front surface of a casing, and
    wherein when only said vertical swing arm is moved forwards from said forwardly moved position starting from the condition where said left forward-rearward movement arm, said right forward-rearward movement arm and said vertical swing arm are located in said forwardly moved positions, said front panel is thereby swung from said first posture to a second posture such that said front surface thereof faces upwards, resulting in the condition where said recording medium can be loaded and unloaded through said recording medium loading/unloading gate.

2. The in-vehicle apparatus as set forth in claim 1, wherein said drive mechanism includes:
    a left drive mechanism provided at a left side part of said apparatus body and connected to a left side part of said front panel; and
    a right drive mechanism provided at a right side part of said apparatus body and connected to a right side part of said front panel.

3. The in-vehicle apparatus as set forth in claim 2, wherein said left drive mechanism has a left forward-rearward movement arm which extends in the front-rear direction at a left side part of said apparatus body and the front end of which is connected to a left side part of said front panel and moved forwards and rearwards;
    said right drive mechanism has a right forward-rearward movement arm which extends in the front-rear direction at said right side part of said apparatus body and the front end of which is connected to said right side part of said front panel and moved forwards and rearwards; and said inclined use position is attained when one of said left forward-rearward movement arm and said right forward-rearward movement arm is stopped at said attached use position and the other of said left forward-rearward movement arm and said right forward-rearward movement arm is moved forwards from said attached use position.

4. The in-vehicle apparatus as set forth in claim 3, wherein said left forward-rearward movement arm possessed by said left drive mechanism or said right forward-rearward movement arm possessed by said right drive mechanism, provided on the other side and moved forwards, has a circular disk-shaped cam plate;
said cam plate is provided with a forward-rearward movement first cam pin;
the other of said left forward-rearward movement arm and said right forward-rearward movement arm is provided with a forward-rearward movement first cam groove; and
the forward movement of the other of said left forward-rearward movement arm and said right forward-rearward movement arm is performed by engagement of said forward-rearward movement first cam pin with said forward-rearward movement first cam groove and normal rotation of said cam plate.

5. The in-vehicle apparatus as set forth in claim 3, wherein the connection of said left side part of said front panel with the front end of said left forward-rearward movement arm and the connection of said right side part of said front panel with the front end of said right forward-rearward movement arm are each effected through a ball joint.

6. The in-vehicle apparatus as set forth in claim 1, wherein said inclined use position is obtained when that one of said left forward-rearward movement arm and said right forward-rearward movement arm which is on the side where said vertical swing arm is provided is stopped in said forwardly moved position, said vertical swing arm is stopped in said position spaced forwards from said forwardly moved position, and the other of said left forward-rearward movement arm and said right forward-rearward movement arm is moved forwards or rearwards from said forwardly moved position.

7. The in-vehicle apparatus as set forth in claim 6, wherein said left drive mechanism and said right drive mechanism are each provided with a circular disk-shaped cam plate;
said cam plate of one of said left drive mechanism and said right drive mechanism is provided with a forward-rearward movement first cam pin and provided with a stopping cam groove and a vertical swing cam groove;
one of said left forward-rearward movement arm and said right forward-rearward movement arm is provided with a forward-rearward movement first cam groove and a stopping cam pin;
said cam plate of the other of said left drive mechanism and said right drive mechanism is provided with a forward-rearward movement first cam pin and a forward-rearward movement second cam groove;
the other of said left forward-rearward movement arm and said right forward-rearward movement arm is provided with a forward-rearward movement first cam groove and provided with a forward-rearward movement second cam pin;
said vertical swing arm is provided with a forward-rearward movement first cam groove and provided with a vertical swing cam pin;
the movements of said left forward-rearward movement arm and said right forward-rearward movement arm to said forwardly moved positions are effected by engagement of said forward-rearward movement first cam pin and said forward-rearward movement first cam groove of said left drive mechanism and said right drive mechanism with each other and normal rotation of each of said cam plates;
said vertical swing arm is brought into said forwardly moved position together with said left forward-rearward movement arm and said right forward-rearward movement arm by engagement of said forward-rearward movement first cam pin of said one of said cam plates with said forward-rearward movement first cam groove of said vertical swing arm and normal rotation of said cam plate;
the forward movement of said vertical swing arm from said forwardly moved position is effected by disengagement of said forward-rearward movement first cam pin from said forward-rearward movement first cam groove and simultaneous engagement of said vertical swing cam pin with said vertical swing cam groove, due to further normal rotation of said one of said cam plates;
one of said left forward-rearward movement arm and said right forward-rearward movement arm is stopped in said forwardly moved position by disengagement of said forward-rearward movement first cam pin from said forward-rearward movement first cam groove and simultaneous engagement of said stopping cam pin with said stopping cam groove, due to further normal rotation of said one of said cam plates at said forwardly moved position;
said forward movement of said forward and rearward movements of the other of said left forward-rearward movement arm and said right forward-rearward movement arm from said forwardly moved position is effected by disengagement of said forward-rearward movement first cam pin from said forward-rearward movement first cam groove and simultaneous engagement of said forward-rearward movement second cam pin and said forward-rearward movement second cam groove, due to further rotation of said cam plate; and
the rearward movement of said forward and rearward movements of the other of said left forward-rearward movement arm and said right forward-rearward movement arm from said forwardly moved position is effected by reverse rotation of said cam plate in the condition where said forward-rearward movement first cam pin and said forward-rearward movement first cam groove are in engagement with each other.

8. The in-vehicle apparatus as set forth in claim 1, wherein said left drive mechanism and said right drive mechanism are each provided with a circular disk-shaped cam plate;
said cam plate of one of said left drive mechanism and said right drive mechanism is provided with a forward-rearward movement first cam pin and provided with a stopping cam groove and a vertical swing cam groove;
one of said left forward-rearward movement arm and said right forward-rearward movement arm is provided with a forward-rearward movement first cam groove and provided with a stopping cam pin;
said cam plate of the other of said left drive mechanism and said right drive mechanism is provided with a forward-rearward movement first cam pin;

the other of said left forward-rearward movement arm and said right forward-rearward movement arm is provided with a forward-rearward movement first cam groove;

said vertical swing arm is provided with a forward-rearward movement first groove and provided with a vertical swing cam pin;

said movements of said left forward-rearward movement arm and said right forward-rearward movement arm to said forwardly moved positions are effected by engagement of said forward-rearward movement first cam pin and said forward-rearward movement first cam groove of said left drive mechanism and said right drive mechanism with each other and normal rotation of each of said cam plates;

said vertical swing arm is brought into said forwardly moved position together with said left forward-rearward movement arm and said right forward-rearward movement arm by engagement of said forward-rearward movement first cam pin of said one of said cam plates with said forward-rearward movement first cam groove of said vertical swing arm and normal rotation of said cam plate;

said forward movement of said vertical swing arm from said forwardly moved position is effected by disengagement of said forward-rearward movement first cam pin from said forward-rearward movement first cam groove and simultaneous engagement of said vertical swing cam pin with said vertical swing cam groove, due to further normal rotation of said one of said cam plates; and one of said left forward-rearward movement arm and said right forward-rearward movement arm is stopped in said forwardly moved position by disengagement of said forward-rearward movement first cam pin from said forward-rearward movement first cam groove and simultaneous engagement of said stopping cam pin with said stopping cam groove, due to further normal rotation of said one of said cam plates at said forwardly moved position.

9. The in-vehicle apparatus as set forth in claim 1,
wherein said drive mechanism includes a left drive mechanism provided at a left side part of said apparatus body and connected to a left side part of said front panel, and a right drive mechanism provided at a right side part of said apparatus body and connected to a right side part of said front panel;

said left drive mechanism has a left forward-rearward movement arm which extends in the front-rear direction at a left side part of said apparatus body, the front end of which is connected to a left side part of said front panel and which is moved forwards and rearwards;

said right drive mechanism has a right forward-rearward movement arm which extends in the front-rear direction at a right side part of said apparatus body, the front end of which is connected to a right side part of said front panel and which is moved forwards and rearwards; and said inclined use position is obtained when said left forward-rearward movement arm and said right forward-rearward movement arm are located at forwardly moved positions spaced forwards by equal distances from a front surface of a casing, one of said left forward-rearward movement arm and said right forward-rearward movement arm is stopped in said forwardly moved position, and the other of said left forward-rearward movement arm and said right forward-rearward movement arm is moved forwards or rearwards.

10. The in-vehicle apparatus as set forth in claim 9,
wherein said left drive mechanism and said right drive mechanism are each provided with a circular disk-shaped cam plate;

said cam plate of one of said left drive mechanism and said right drive mechanism is provided with a forward-rearward movement first cam pin and provided with a stopping cam groove;

one of said left forward-rearward movement arm and said right forward-rearward movement arm is provided with a forward-rearward movement first cam groove and provided with a stopping cam pin;

said cam plate of the other of said left drive mechanism and said right drive mechanism is provided with a forward-rearward movement first cam pin and provided with a forward-rearward movement second cam groove;

the other of said left forward-rearward movement arm and said right forward-rearward movement arm is provided with a forward-rearward movement first cam groove and provided with a forward-rearward movement second cam pin;

the movements of said left forward-rearward movement arm and said right forward-rearward movement arm to said forwardly moved positions are effected by engagement of said forward-rearward movement first cam pin and said forward-rearward movement first cam groove of said left drive mechanism and said right drive mechanism with each other and normal rotation of each said cam plate;

the stopping of one of said left forward-rearward movement arm and said right forward-rearward movement arm in said forwardly moved position is effected by disengagement of said forward-rearward movement first cam pin from said forward-rearward movement first cam groove and simultaneous engagement of said stopping cam pin with said stopping cam groove, due to further normal rotation of said cam plate;

the forward movement of the forward and rearward movements of the other of said left forward-rearward movement arm and said right forward-rearward movement arm is effected by disengagement of said forward-rearward movement first cam pin from said forward-rearward movement first cam groove and simultaneous engagement of said forward-rearward movement second cam pin with said forward-rearward movement second cam groove, due to further normal rotation of said cam plate; and the rearward movement of the forward and rearward movements of the other of said left forward-rearward movement arm and said right forward-rearward movement arm is effected by reverse rotation of said cam plate in the condition where said forward-rearward movement first cam pin and said forward-rearward movement first cam groove are in engagement with each other.

11. The in-vehicle apparatus as set forth in claim 9,
wherein said front panel is supported by said drive mechanism in a first posture such that said front surface thereof is parallel to said front surface of said apparatus body, and said front panel in said inclined use position is swung by said drive mechanism between said first posture and a second posture such that said front surface thereof tilts upwards.

12. The in-vehicle apparatus as set forth in claim 11,
wherein said drive mechanism includes a left drive mechanism provided at a left side part of said apparatus body and connected to a left side part of said front panel, and a right drive mechanism provided at a right side part of said apparatus body and connected to a right side part of said front panel;

said left drive mechanism has a left forward-rearward movement arm which extends in the front-rear direction at a left side part of said apparatus body, the front end of which is connected to a left side part of said front panel and which is moved forwards and rearwards;

said right drive mechanism has a right forward-rearward movement arm which extends in the front-rear direction at a right side part of said apparatus body, the front end of which is connected to a right side part of said front panel and which is moved forwards and rearwards;

one of said left drive mechanism and said right drive mechanism is provided with a vertical swing arm which extends in the front-rear direction, the front end of which is connected to said front panel and which is moved forwards and rearwards;

said inclined use position is obtained when said left forward-rearward movement arm, said right forward-rearward movement arm and said vertical swing arm are located at forwardly moved positions spaced forwards by equal distances from a front surface of a casing, one of said left forward-rearward movement arm and said right forward-rearward movement arm and said vertical swing arm are stopped in said forwardly moved positions, and the other of said left forward-rearward movement arm and said right forward-rearward movement arm is moved forwards or rearwards; and the transition from said first posture to said second posture of said front panel in said inclined use position is effected by forward movement of said vertical swing arm from said forwardly moved position.

13. The in-vehicle apparatus as set forth in claim 12, wherein said left drive mechanism and said right drive mechanism are each provided with a circular disk-shaped cam plate;

said cam plate of one of said left drive mechanism and said right drive mechanism is provided with a forward-rearward movement first cam pin and provided with a stopping cam groove and a vertical swing cam groove;

one of said left forward-rearward movement arm and said right forward-rearward movement arm is provided with a forward-rearward movement first cam groove and provided with a stopping cam pin;

said cam plate of the other of said left drive mechanism and said right drive mechanism is provided with a forward-rearward movement first cam pin and provided with a forward-rearward movement second cam groove;

the other of said left forward-rearward movement arm and said right forward-rearward movement arm is provided with a forward-rearward movement first cam groove and provided with a forward-rearward movement second cam pin;

said vertical swing arm is provided with a forward-rearward movement first cam groove and provided with a vertical swing cam pin;

the movements of said left forward-rearward movement arm and said right forward-rearward movement arm to said forwardly moved positions are effected by engagement of said forward-rearward movement first cam pin and said forward-rearward movement first cam groove of said left drive mechanism and said right drive mechanism with each other and normal rotation of each said cam plate;

the stopping of one of said left forward-rearward movement arm and said right forward-rearward movement arm in said forwardly moved position is effected by disengagement of said forward-rearward movement first cam pin from said forward-rearward movement first cam groove and simultaneous engagement of said stopping cam pin with said stopping cam groove, due to further normal rotation of said cam plate;

the forward movement of the forward and rearward movements of the other of said left forward-rearward movement arm and said right forward-rearward movement arm is effected by disengagement of said forward-rearward movement first cam pin from said forward-rearward movement first cam groove and simultaneous engagement of said forward-rearward movement second cam pin with said forward-rearward movement second cam groove, due to further normal rotation of said cam plate;

the rearward movement of the forward and rearward movements of the other of said left forward-rearward movement arm and said right forward-rearward movement arm is effected by reverse rotation of said cam plate in the condition where said forward-rearward movement first cam pin and said forward-rearward movement first cam groove are in engagement with each other;

said vertical swing arm is brought to said forwardly moved position together with said left forward-rearward movement arm and said right forward-rearward movement arm by engagement of said forward-rearward movement first cam pin with said forward-rearward movement cam groove of said vertical swing arm and normal rotation of each said cam plate; and the forward movement of said vertical swing arm in said inclined use position is effected by disengagement of said forward-rearward movement first cam pin from said forward-rearward movement first cam groove and simultaneous engagement of said vertical swing cam pin with said vertical swing cam groove, due to further normal rotation of said cam plate.

14. The in-vehicle apparatus as set forth in claim 1, wherein the connection of said left side part of said front panel with the front end of said left forward-rearward movement arm, the connection of said right side part of said front panel with the front end of said right forward-rearward movement arm, and the connection of said front panel with said vertical swing arm are each effected through a ball joint.

15. The in-vehicle apparatus as set forth in claim 1, wherein said reproduction unit and said audio output unit constitute a part of a car audio system.

16. The in-vehicle apparatus as set forth in claim 1, wherein said reproduction unit and said audio output unit constitute a part of a car audio system; and
wherein said operating member is a member for operating said car audio system.

17. The in-vehicle apparatus as set forth in claim 1, wherein said front panel is provided with a display unit for displaying information related to operation of said apparatus body.

18. The in-vehicle apparatus as set forth in claim 1, wherein said front panel has a horizontally elongate rectangular shape having a left-right width greater than the vertical height thereof.

19. The in-vehicle apparatus as set forth in claim 1, wherein a holder for detachably holding said front panel is provided, and said drive mechanism is connecting said apparatus body and said holder to each other.

* * * * *